(12) United States Patent
Nallu et al.

(10) Patent No.: US 9,858,607 B2
(45) Date of Patent: Jan. 2, 2018

(54) SYSTEMS AND METHODS FOR IN-VEHICLE NAVIGATED SHOPPING

(71) Applicant: eBay Inc., San Jose, CA (US)

(72) Inventors: Praveen Nallu, Tamilnadu (IN); Swami Raghavan, Tamilnadu (IN); Dane Howard, Los Gatos, CA (US); Jack Phillip Abraham, Palo Alto, CA (US); Shannon B. Vosseller, San Francisco, CA (US); Michael George Lenahan, Moraga, CA (US); Ben Mitchell, Oakland, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/809,543

(22) Filed: Jul. 27, 2015

(65) Prior Publication Data

US 2015/0330806 A1 Nov. 19, 2015

Related U.S. Application Data

(63) Continuation of application No. 14/369,991, filed as application No. PCT/US2013/027415 on Feb. 22, 2013.

(Continued)

(51) Int. Cl.
*G01C 22/00* (2006.01)
*G06Q 30/06* (2012.01)
(Continued)

(52) U.S. Cl.
CPC ....... *G06Q 30/0625* (2013.01); *G01C 21/206* (2013.01); *G01C 21/3476* (2013.01);
(Continued)

(58) Field of Classification Search
CPC .......................... G06Q 30/0625; G01C 21/206
See application file for complete search history.

(56) References Cited

U.S. PATENT DOCUMENTS 6,259,381 B1 7/2001 Small
6,879,836 B2 4/2005 Nakamoto et al.
(Continued)

FOREIGN PATENT DOCUMENTS

CN 101743455 A 6/2010
CN 104272333 A 1/2015
(Continued)

OTHER PUBLICATIONS

"U.S. Appl. No. 13/691,291, Non Final Office Action dated Dec. 23, 2014", 13 pgs.

(Continued)

*Primary Examiner* — Adam Alharbi
(74) *Attorney, Agent, or Firm* — Schwegman Lundberg & Woessner, P.A.

(57) ABSTRACT

Systems and methods to provide a navigated-shopping service are discussed. In an example, a method for navigated-shopping can include receiving a destination location, accessing a route to the destination, displaying the route with indications of a plurality of items for purchase, receiving selection of a selected item, and purchasing the selected item. The plurality of items for purchase can be within a predefined distance of at least one point along the route. The selection of the selected item can include selection of a retail location of a plurality of retail locations along the route.

17 Claims, 22 Drawing Sheets

Related U.S. Application Data

(60) Provisional application No. 61/649,061, filed on May 18, 2012, provisional application No. 61/649,091, filed on May 18, 2012, provisional application No. 61/601,822, filed on Feb. 22, 2012, provisional application No. 61/614,930, filed on Mar. 23, 2012.

(51) Int. Cl.
*G01C 21/36* (2006.01)
*G06F 17/30* (2006.01)
*G01C 21/34* (2006.01)
*G01C 21/20* (2006.01)
*H04W 4/02* (2009.01)

(52) U.S. Cl.
CPC ..... *G01C 21/3682* (2013.01); *G06F 17/3087* (2013.01); *G06F 17/30528* (2013.01); *G06F 17/30554* (2013.01); *G06F 17/30657* (2013.01); *G06F 17/30669* (2013.01); *G06F 17/30699* (2013.01); *G06Q 30/0601* (2013.01); *G06Q 30/0633* (2013.01); *G06Q 30/0639* (2013.01); *G06Q 30/0641* (2013.01); *H04W 4/023* (2013.01)

(56) References Cited

U.S. PATENT DOCUMENTS

| | | | |
|---|---|---|---|
| 6,970,871 B1 | 11/2005 | Rayburn | |
| 7,308,356 B2 | 12/2007 | Melaku et al. | |
| 7,427,023 B2 | 9/2008 | Suenbuel | |
| 7,600,034 B2 | 10/2009 | Nasu et al. | |
| 7,698,062 B1 | 4/2010 | Mcmullen et al. | |
| 7,756,757 B1* | 7/2010 | Oakes, III | G06Q 10/047 705/26.1 |
| 7,848,765 B2 | 12/2010 | Phillips et al. | |
| 8,069,120 B2 | 11/2011 | Buehler et al. | |
| 8,600,659 B1 | 12/2013 | Scherzinger | |
| 9,141,988 B2 | 9/2015 | Howard et al. | |
| 9,171,327 B2 | 10/2015 | Nallu et al. | |
| 9,547,872 B2 | 1/2017 | Howard et al. | |
| 9,581,463 B2 | 2/2017 | Nallu et al. | |
| 9,679,325 B2 | 6/2017 | Nallu et al. | |
| 2002/0010625 A1 | 1/2002 | Smith et al. | |
| 2002/0130906 A1 | 9/2002 | Miyaki | |
| 2002/0133411 A1 | 9/2002 | Nakamoto et al. | |
| 2004/0011866 A1 | 1/2004 | Saad | |
| 2004/0143386 A1 | 7/2004 | Yoshihara et al. | |
| 2005/0154653 A1 | 7/2005 | Jongebloed | |
| 2006/0010037 A1 | 1/2006 | Angert et al. | |
| 2006/0025923 A1 | 2/2006 | Dotan et al. | |
| 2006/0058948 A1 | 3/2006 | Blass et al. | |
| 2006/0074763 A1 | 4/2006 | Schmid | |
| 2006/0287810 A1 | 12/2006 | Sadri et al. | |
| 2007/0124066 A1 | 5/2007 | Kikuchi et al. | |
| 2007/0150369 A1 | 6/2007 | Zivin | |
| 2007/0226082 A1 | 9/2007 | Leal | |
| 2008/0005055 A1 | 1/2008 | Horvitz | |
| 2008/0033633 A1 | 2/2008 | Akiyoshi et al. | |
| 2008/0082424 A1 | 4/2008 | Walton | |
| 2008/0126145 A1* | 5/2008 | Rackley, III | G06Q 20/102 455/406 |
| 2008/0249870 A1 | 10/2008 | Angell et al. | |
| 2008/0301102 A1 | 12/2008 | Liang | |
| 2009/0043665 A1 | 2/2009 | Tirumalareddy et al. | |
| 2009/0167553 A1 | 7/2009 | Hong et al. | |
| 2009/0240518 A1 | 9/2009 | Borom et al. | |
| 2010/0228574 A1 | 9/2010 | Mundinger | |
| 2011/0112762 A1* | 5/2011 | Gruijters | G01C 21/32 701/532 |
| 2011/0125794 A1* | 5/2011 | Hutschemaekers | G08G 1/202 707/776 |
| 2011/0145093 A1 | 6/2011 | Paradise et al. | |
| 2011/0145096 A1 | 6/2011 | Jensen | |
| 2011/0179018 A1 | 7/2011 | Lazaridis et al. | |
| 2011/0218933 A1 | 9/2011 | Hunsaker et al. | |
| 2011/0231334 A1 | 9/2011 | Jindel | |
| 2011/0320318 A1 | 12/2011 | Patel et al. | |
| 2012/0023034 A1 | 1/2012 | Lynch et al. | |
| 2012/0036014 A1 | 2/2012 | Sunkada | |
| 2012/0116922 A1 | 5/2012 | Ku | |
| 2012/0290383 A1 | 11/2012 | Busch | |
| 2013/0054135 A1 | 2/2013 | Backsen, Jr. | |
| 2013/0198031 A1 | 8/2013 | Mitchell et al. | |
| 2013/0218463 A1 | 8/2013 | Howard et al. | |
| 2013/0218912 A1 | 8/2013 | Howard et al. | |
| 2013/0226731 A1 | 8/2013 | Macneille et al. | |
| 2013/0253832 A1 | 9/2013 | Nallu et al. | |
| 2013/0282533 A1 | 10/2013 | Foran-Owens et al. | |
| 2014/0058886 A1 | 2/2014 | Gopalakrishnan | |
| 2014/0074743 A1 | 3/2014 | Rademaker | |
| 2014/0172571 A1 | 6/2014 | Fabrikant et al. | |
| 2014/0188658 A1 | 7/2014 | Li et al. | |
| 2014/0207611 A1 | 7/2014 | Cleary et al. | |
| 2014/0358724 A1 | 12/2014 | Nallu et al. | |
| 2015/0066649 A1 | 3/2015 | Kumar et al. | |
| 2015/0134488 A1 | 5/2015 | Maclaurin et al. | |
| 2016/0003637 A1* | 1/2016 | Andersen | G01C 21/3617 701/519 |
| 2016/0012509 A1 | 1/2016 | Howard et al. | |
| 2016/0041000 A1 | 2/2016 | Nallu et al. | |
| 2017/0122746 A1 | 5/2017 | Howard et al. | |
| 2017/0131113 A1 | 5/2017 | Nallu et al. | |

FOREIGN PATENT DOCUMENTS

| | | |
|---|---|---|
| DE | 212013000071 U1 | 11/2014 |
| EP | 510172 B1 | 7/1995 |
| JP | 2010054389 A | 3/2010 |
| KR | 1020050009092 A | 1/2005 |
| KR | 20090016101 A | 2/2009 |
| WO | WO-2013126763 A1 | 8/2013 |

OTHER PUBLICATIONS

"U.S. Appl. No. 13/691,291, Notice of Allowance dated Jun. 24, 2015", 11 pgs.

"U.S. Appl. No. 13/691,291, Response filed Feb. 23, 2015 to Non Final Office Action dated Dec. 23, 2014", 14 pgs.

"U.S. Appl. No. 13/725,669, Examiner Interview Summary dated Feb. 27, 2015", 3 pgs.

"U.S. Appl. No. 13/725,669, Non Final Office Action dated Jun. 26, 2014", 9 pgs.

"U.S. Appl. No. 13/725,669, Non Final Office Action dated Dec. 12, 2014", 10 pgs.

"U.S. Appl. No. 13/725,669, Notice of Allowance dated May 13, 2015", 9 pgs.

"U.S. Appl. No. 13/725,669, Response filed Mar. 12, 2015 to Non Final Office Action dated Dec. 12, 2014", 12 pgs.

"U.S. Appl. No. 13/725,669, Response filed Oct. 27, 2014 Non Final Office Action dated Jun. 26, 2014", 12 pgs.

"U.S. Appl. No. 13/725,766, Examiner Interview Summary dated Apr. 29, 2015", 3 pgs.

"U.S. Appl. No. 13/725,766, Final Office Action dated Apr. 1, 2015", 24 pgs.

"U.S. Appl. No. 13/725,766, Non Final Office Action dated Nov. 20, 2014", 21 pgs.

"U.S. Appl. No. 13/725,766, Response filed Feb. 20, 2015 to Non Final Office Action dated Nov. 20, 2014", 25 pgs.

"U.S. Appl. No. 13/725,766, Response filed Aug. 3, 2015 to Final Office Action dated Apr. 1, 2015", 31 pgs.

"U.S. Appl. No. 14/369,991, Non Final Office Action dated Dec. 23, 2014", 13 pgs.

"U.S. Appl. No. 14/369,991, Notice of Allowance dated Apr. 27, 2015", 8 pgs.

"U.S. Appl. No. 14/369,991, Preliminary Amendment filed Jun. 30, 2014", 3 pgs.

"U.S. Appl. No. 14/369,991, Response filed Feb. 23, 2015 to Non Final Office Action dated Dec. 23, 2014", 15 pgs.

(56) References Cited

OTHER PUBLICATIONS

"U.S. Appl. No. 14/474,117, Non Final Office Action dated Jun. 16, 2015", 19 pgs.
"Australian Application Serial No. 2013222225, Office Action dated Apr. 14, 2015", 3 pgs.
"Canadian Application Serial No. 2,861,822, Office Action dated May 22, 2015", 5 pgs.
"International Application Serial No. PCT/US2013/027415, International Preliminary Report on Patentability dated Sep. 4, 2014", 8 pgs.
"International Application Serial No. PCT/US2013/027415, International Search Report dated May 3, 2013", 2 pgs.
"International Application Serial No. PCT/US2013/027415, Written Opinion dated May 3, 2013", 6 pgs.
"U.S. Appl. No. 13/725,766, Non Final Office Action dated Oct. 29, 2015", 21 pgs.
"U.S. Appl. No. 14/369,991, Non Final Office Action dated Sep. 22, 2015", 14 pgs.
"U.S. Appl. No. 14/474,117, Final Office Action dated Dec. 4, 2015", 23 pgs.
"Australian Application Serial No. 2013222225, Response filed Sep. 30, 2015 to Office Action dated Apr. 14, 2015", 22 pgs.
"Australian Application Serial No. 2013222225, Subsequent Examiners Report dated Nov. 3, 2015", 3 pgs.
"Canadian Application Serial No. 2,861,822, Response filed Nov. 20, 2015 to Office Action dated May 22, 2015", 24 pgs.
"Korean Application Serial No. 2014-7026159, Office Action dated Oct. 19, 2015", w/ English Translation, 10 pgs.
"U.S. Appl. No. 13/725,766, Corrected Notice of Allowance dated Dec. 13, 2016", 2 pgs.
"U.S. Appl. No. 13/725,766, Notice of Allowance dated Aug. 31, 2016", 10 pgs.
"U.S. Appl. No. 14/369,991, Notice of Allowance dated Oct. 24, 2016", 5 pgs.
"U.S. Appl. No. 14/369,991, Response filed Oct. 4, 2016 to Non Final Office Action dated Jul. 18, 2016", 15 pgs.
"U.S. Appl. No. 14/474,117, Non Final Office Action dated Dec. 19, 2016", 26 pgs.
"U.S. Appl. No. 14/859,601, First Action Interview—Pre-Interview Communication dated Oct. 14, 2016", 3 pgs.
"U.S. Appl. No. 14/922,327, Notice of Allowance dated Oct. 13, 2016", 5 pgs.
"U.S. Appl. No. 14/922,327, Response filed Sep. 19, 2016 to Final Office Action dated Jun. 29, 2016", 10 pgs.
"Canadian Application Serial No. 2,861,822, Response filed Nov. 22, 2016 to Office Action dated May 31, 2016", 14 pgs.
"Chinese Application Serial No. 201380010168.4, Office Action dated Oct. 17, 2016", with English Translation, 19 pgs.
"Korean Application Serial No. 2014-7026159, Final Office Action dated Dec. 28, 2016", (With English Translation), 5 pgs.
"Korean Application Serial No. 2014-7026159, Response filed Aug. 26, 2016 to Reasons for Rejection dated May 27, 2016", (English Translation of Claims), 21 pgs.
"U.S. Appl. No. 14/474,117, Response filed Mar. 20, 2017 to Non Final Office Action dated Dec. 19, 2016", 20 pgs.
"U.S. Appl. No. 14/859,601, First Action Interview—Office Action Summary dated Jan. 31, 2017", 6 pgs.
"U.S. Appl. No. 14/859,601, Response filed Mar. 31, 2017 to Non Final Office Action dated Jan. 31, 2017", 13 pgs.
"U.S. Appl. No. 15/414,772, Non Final Office Action dated Apr. 20, 2017", 7 pgs.
"U.S. Appl. No. 15/414,772, Preliminary Amendment filed Apr. 14, 2017", 8 pgs.
"Canadian Application Serial No. 2,861,822, Office Action dated Apr. 20, 2017", 3 pgs.
"Chinese Application Serial No. 201380010168.4, Response filed Mar. 1, 2017 to Office Action dated Oct. 17, 2016", W / English Claims, 14 pgs.
"Korean Application Serial No. 2014-7026159, Final Office Action dated Apr. 28, 2017", W / English Translation, 5 pgs.
"Korean Application Serial No. 2014-7026159, Response to Final Office Action dated Mar. 29, 2017.", W/ English Claims, 22 pgs.
"U.S. Appl. No. 13/725,765, Examiner Interview Summary dated Dec. 11, 2015", 3 pgs.
"U.S. Appl. No. 13/725,766, Examiner Interview Summary dated Jun. 23, 2016", 3 pgs.
"U.S. Appl. No. 13/725,766, Final Office Action dated May 3, 2016", 23 pgs.
"U.S. Appl. No. 13/725,766, Response filed Jan. 29, 2016 to Non Final Office Action dated Oct. 29, 2015", 18 pgs.
"U.S. Appl. No. 13/725,766, Response filed Aug. 3, 2016 to Final Office Action dated May 3, 2016", 12 pgs.
"U.S. Appl. No. 14/369,991, Non Final Office Action dated Jul. 18, 2016", 16 pgs.
"U.S. Appl. No. 14/369,991, Notice of Allowance dated Feb. 17, 2016", 5 pgs.
"U.S. Appl. No. 14/369,991, Response filed Jan. 18, 2016 to Non Final Office Action dated Sep. 22, 2015", 13 pgs.
"U.S. Appl. No. 14/474,117, Response filed Mar. 4, 2016 to Final Office Action dated Dec. 4, 2015", 20 pgs.
"U.S. Appl. No. 14/922,327, Final Office Action dated Jun. 29, 2016", 14 pgs.
"U.S. Appl. No. 14/922,327, Non Final Office Action dated Feb. 1, 2016", 13 pgs.
"U.S. Appl. No. 14/922,327, Response filed May 31, 2016 to Non Final Office Action dated Feb. 1, 2016", 14 pgs.
"Canadian Application Serial No. 2,861,822, Office Action dated May 31, 2016", 5 pgs.
"Korean Application Serial No. 2014-7026159, Reasons for Rejection dated May 27, 2016", w/English Translation, 10 pgs.
"Korean Application Serial No. 2014-7026159, Response filed Jan. 19, 2016 to Office Action dated Oct. 19, 2015", w/English Claims, 23 pgs.
"U.S. Appl. No. 14/474,117, Non Final Office Action dated Jun. 26, 2017", 25 pgs.
"U.S. Appl. No. 14/859,601, Examiner Interview Summary dated May 31, 2017", 3 pgs.
"U.S. Appl. No. 14/859,601, Final Office Action dated May 16, 2017", 12 pgs.
"U.S. Appl. No. 14/859,601, Response filed May 31, 2017 to Final Office Action dated May 16, 2017", 18 pgs.
"U.S. Appl. No. 15/406,283, Preliminary Amendment filed Jun. 1, 2017", 7 pgs.
"U.S. Appl. No. 15/414,772, Response filed Jul. 20, 2017 to Non Final Office Action dated Apr. 20, 2017", 12 pgs.
"Australian Application Serial No. 2016202371, First Examination Report dated Jun. 29, 2017", 4 pgs.
"Chinese Application Serial No. 201380010168.4, Office Action dated Jun. 30, 2017", 10 pgs.

* cited by examiner

SYSTEMS AND METHODS FOR IN-VEHICLE NAVIGATED SHOPPING

CLAIM OF PRIORITY

This application is a continuation of U.S. patent application Ser. No. 14/369,991, filed Jun. 30, 2014 which is a U.S. National Stage Filing under 35 U.S.C. 371 from International Application No. PCT/US2013/027415, filed Feb. 22, 2013 and published in English as WO 2013/126763 A1 on Aug. 29, 2013, and claims the benefit of U.S. Provisional Application No. 61/649,061, filed May 18, 2012, and titled "SEARCH RESULTS, SORTED BY DISTANCE AND/OR TIME." This application also claims benefit of U.S. Provisional Application No. 61/649,091, filed May 18, 2012, and titled "CORRIDOR-BASED SEARCH RESULTS." This application further claims benefit of U.S. Provisional Application No. 61/601,822, filed Feb. 22, 2012, and titled "MOBILE LOCAL MARKETPLACE." This application yet further claims benefit of U.S. Provisional Application No. 61/614,930, filed Mar. 23, 2012, and titled "SYSTEMS AND METHODS FOR NAVIGATION ENABLED SHOPPING." Each of the U.S. provisional applications referenced above is incorporated herein by reference in its entirety.

BACKGROUND

The Internet and the World Wide Web have given rise to a wide variety of on-line retailers that operate virtual stores from which consumers can purchase products (i.e., merchandise, or goods) as well as services. Although the popularity of these on-line retail sites is clearly evidenced by their increasing sales, for a variety of reasons, some consumers may still prefer to purchase products and services in a more conventional manner—i.e., via a brick-and-mortar store. Even when purchasing products and services from a brick-and-mortar store, various web-based applications and tools may be used to perform preliminary research about products and services. Increasingly, brick-and-mortar stores are providing online and mobile-focused purchasing options to augment traditional in-store sales and to compete with purely online retailers.

DESCRIPTION OF THE DRAWINGS

Some embodiments are illustrated by way of example and not limitation in the figures of the accompanying drawings.

DEFINITIONS

Figure 1A:
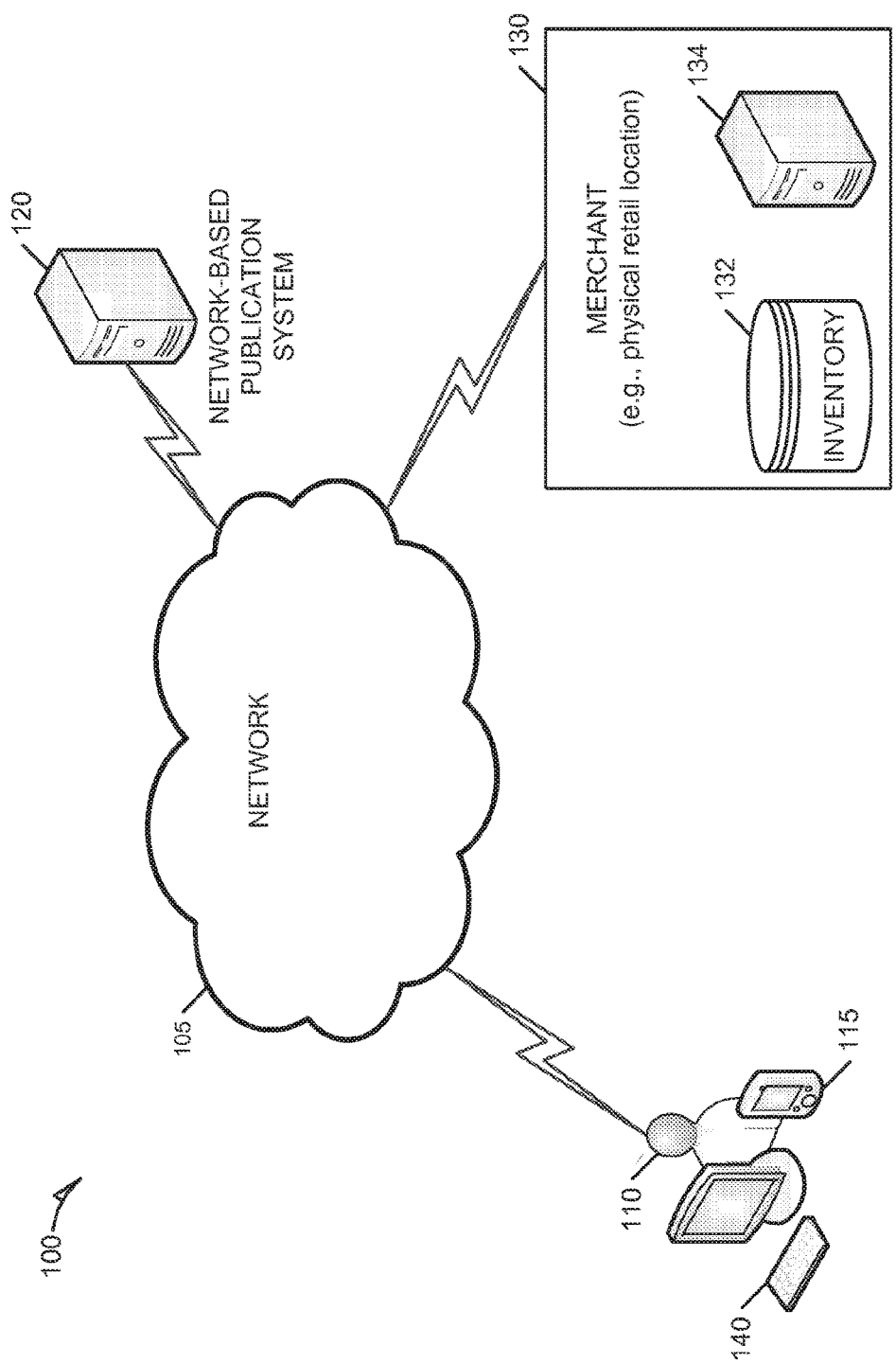
FIG. 1A is a block diagram depicting a system for delivering search results, where the search results are arranged in ascending order of the distance and/or travel time between a user's location and the location of a product or service presented with a search result listing, according to an example embodiment.

Location—For the purposes of this specification and the associated claims, the term "location" is used to refer to a geographic location, such as a longitude/latitude combination or a street address. The term location is also used within this specification in reference to a physical location associated with a retail outlet (e.g., store).

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Overview

The present inventors have recognized, among other things, that the pervasive use of mobile devices with location determination capabilities can enable a wide range of useful location-based search and display capabilities. Local retail merchants have had to battle against the rise of online alternatives as the Internet has grown as a shopping alternative. The present inventors have recognized that these local retail merchants can leverage location-based services, delivered via mobile devices, to take back the advantage of a local presence. For example, in an example a local merchant can gain visibility through location-based search results focused on presenting a user with options to obtain a product or service within a certain travel time of their current location. In another example, local merchants can increase traffic flow through a navigated shopping system that guides a user to obtain a list of items in the most time efficient manner.

The following, non-limiting examples detail certain aspects of the present systems and methods to solve the challenges and provide the benefits discussed above.

Example 1 can include a method for enabling a navigated shopping service. The method can include receiving a destination location, accessing a route to the destination, displaying the route, receiving a selection of an item, and purchasing the selected item. The destination location can be received from a navigation-enabled mobile device. Displaying the route can include indication a plurality of items for purchase at a plurality of retail locations, with each retail location of the plurality of retail locations is within a predefined distance of at least one point along the route. The selected item can be selected from the plurality of items identified along the route for purchase from an associated retail location of the plurality of retail locations. Finally, the purchase of the selected item can occur from a retail location along the route via the mobile device.

In Example 2, the method of Example 1 can optionally include, receiving, via the navigation-enabled mobile device, a list of items a user desires to purchase while travelling to the destination location, the plurality of items for purchase identified along the route including at least a portion of the list of items.

In Example 3, the method of any one of Examples 1 and 2 can optionally include displaying the route includes displaying an alternative retail location having an item of the plurality of items for purchase, the alternative retail location displayed along the route.

In Example 4, the method of any one of Examples 1 through 3 can optionally include guiding, via the navigation-enabled mobile device, a user along the route, the route updated to include the associated retail location as an intermediate destination along the route to the destination location.

In Example 5, the method of Example 4 can optionally include receiving a second selected item and updating the route accordingly. In this example, while guiding the user along the route a second selected item from the plurality of items identified along the route can be received. Subsequently, the route can be updated, on the navigation-enabled mobile device, in response to receiving the second selected item to include a second retail location associated with the second selected item as a second intermediate destination along the route to the destination location.

In Example 6, the method of any one of Examples 1 through 5 can optionally include purchasing the selected item includes receiving, on the navigation-enabled mobile device, a receipt indicating transaction details for the purchased selected item from the associated retail location.

In Example 7, the method of Example 6 can optionally include receiving the receipt includes receiving pick-up instructions from the associated retail location.

In Example 8, the method of any one of Examples 1 through 7 can optionally include purchasing the selected item includes transmitting, from the mobile device, a payment authorization for payment to the associated retail location for the selected item.

In Example 9, the method of any one of Examples 1 through 8 can optionally include receiving selection of a selected item prompts the navigation-enabled mobile device to display a purchase option associated with the selected item.

In Example 10, the method of Example 9 can optionally include displaying delivery options for the selected item.

Example 11 can include a navigated-shopping-service server for providing a navigated shopping service. The navigated-shopping-service server can include a network connection, one or more processors, and a memory device including instructions. The instructions can, when executed on the navigated-shopping-service server, cause the server to perform the following operations: receive a planned route of travel; access a list of items, location a plurality of merchants, and transmit the plurality of merchant to a mobile device. The planned route of travel can be received from a mobile device. The list of items can include a plurality of items a user has indicated an interest in purchasing. The plurality of merchants can include merchants within a predefined distance of the planned route of travel. Each of the merchants can sell and/or have in inventory at least one of the items on the list of items. Finally, transmitting the plurality of merchants to a mobile device can include location information for each merchant of the plurality of merchants.

In Example 12, the server of Example 11 can optionally include instructions that cause the server to receive a plurality of selected items and transmit purchase requests for the plurality of selected items. In an example, receiving, from the mobile device, the plurality of selected items can include information identifying, for each item of the plurality of selected items, a selected merchant of the plurality of merchants. Transmitting the purchase requests can include sending the requests to the selected merchants.

In Example 13, the server of Example 12 can optionally include instructions that cause the server to: receive purchase confirmations from at least a portion of the selected merchants; and transmit, to the mobile device, the purchase confirmations received from the selected merchants.

In Example 14, the server of any one of Examples 12 and 13 can optionally include instructions that cause the server to: receive, from the mobile device, payment authorization data for the plurality of selected items; and instructions that cause the server to transmit the payment authorization data.

In Example 15, the server of any one of Examples 11 through 14 can optionally include instructions that cause the server to receive the list of items from the mobile device.

In Example 16, the server of any one of Examples 11 through 15 can optionally include instructions that cause the server to access inventory data associated with the plurality of merchants. Further, Example 16 can optionally include instructions that cause the server to transmit inventory data associated with the plurality of merchants.

Example 17 can include a machine-readable storage medium that includes instructions for providing a navigated shopping service. In this example, the machine-readable storage medium can include instructions that, when executed on a suitable machine, can cause the machine to perform any of the Examples 1 through 10.

Example 18 can include a method for providing search results arranged by time to obtain the product or service. In an example, the method can include operations such as receiving a search query, generating search results, calculating a time to obtain for each result, and arranging the search results based at least in part on the time to obtain calculation. In this example, the search query can include a current location of a mobile device making the request. The search results can include a plurality of listings, with each listing of the plurality of listings including a location, the location representing at least one of a physical location proximate the current location and a delivery time to the current location.

In Example 19, the method of Example 18 can optionally include a time to obtain that represents one of the following timeframes: a time of travel between the current location and a location associated with each listing of the plurality of listings that is associated with a physical address; or a time of delivery to the current location associated with each listing of the plurality of listings that is associated with an online merchant.

In Example 20, the method of any one of Examples 18 and 19 can optionally include generating search results includes identifying a first plurality of listings associated with a local merchant and identifying a second plurality of listings associated with online merchants, and including both the first plurality of listings and the second plurality of listings in the plurality of listings.

In Example 21, the method of any one of Examples 18 through 20 can optionally include displaying, on the mobile device, a map view including a first indicator depicting the current location and a plurality of second indictors, each second indicator depicting a location associated with each listing of the plurality of listings that includes a physical location within the map view.

In Example 22, the method of Example 21 can optionally include receiving, via the mobile device, a user input indicating a maximum travel time, and displaying the map view by filtering the plurality of second indicators based on the maximum travel time.

In Example 23, the method of Example 22 can optionally include receiving the user input includes receiving a selected mode of transportation, wherein the selected mode of transportation is selected from one of a group of modes of transportation including: private automobile, public transportation, bicycle, and walking.

In Example 24, the method of any one of Examples 18 through 23 can optionally include displaying includes displaying a time-to-obtain timeline, the time-to-obtain timeline including a first plurality of listing indicators arranged according to travel time from the current location and a second plurality of listing indicators arranged according to shipping time to the current location. Additionally, the first plurality of listing indictors can represent a first portion of the plurality of listings, and each listing of the first portion of the plurality of listings can be associated with a merchant having a physical location within a predefined distance of the current location. Further, the second plurality of listing indicators can represent a second portion of the plurality of listings, and each listing of the second portion of the plurality of listings can be associated with an online merchant.

In Example 25, the method of Example 24 can optionally include displaying the time-to-obtain timeline includes displaying a map view correlated to a selection mechanism, the selection mechanism enabling selection of a maximum time to obtain along the time-to-obtain timeline.

Example 26 can include a machine-readable storage medium that includes instructions for providing search results arranged by time to obtain the product or service. In this example, the machine-readable storage medium can include instructions that, when executed on a suitable machine, can cause the machine to perform any of the Examples 18 through 25.

Example 27 can include a mobile device for obtaining and displaying search results arranged by time to obtain the product or service. In an example, the mobile device can include a display and a processor coupled to a memory device. The memory device can include instructions that cause the mobile device to receive a search query, generate search results, calculate a time to obtain, and arrange the search results based at least in part on the time to obtain calculations. The mobile device can receive or determine a current location of the mobile device to include in the search query. The search results can include a plurality of listings, with each listing of the plurality of listings including a location, the location representing at least one of a physical location proximate the current location and a delivery time to the current location.

In Example 28, the mobile device of Example 27 can optionally include a time to obtain that represents one of the following timeframes: a time of travel between the current location and a location associated with each listing of the plurality of listings that is associated with a physical address; or a time of delivery to the current location associated with each listing of the plurality of listings that is associated with an online merchant.

In Example 29, the mobile device of any one of Examples 27 or 28 can optionally include instructions that cause the mobile device to identify a first plurality of listings associated with a local merchant and identifying a second plurality of listings associated with online merchants, and including both the first plurality of listings and the second plurality of listings in the plurality of listings.

In Example 30, the mobile device of any one of Examples 27 through 29 can optionally include instructions that cause the mobile device to display a time-to-obtain timeline, the time-to-obtain timeline including a first plurality of listing indicators arranged according to travel time from the current location and a second plurality of listing indicators arranged according to shipping time to the current location. Further, the first plurality of listing indictors can represent a first portion of the plurality of listings, and each listing of the first portion of the plurality of listings can be associated with a merchant having a physical location within a predefined distance of the current location, Additionally, the second plurality of listing indicators can represent a second portion of the plurality of listings, each listing of the second portion of the plurality of listings can be associated with an online merchant.

Example 31 can include a method for providing search results within a geographical search corridor. In an example, the method can include displaying an interface to define a route of travel, accessing a search corridor, filtering a plurality of search results based at least in part on the search corridor, and displaying a the search results. In this example, the interface can enable a user to define a route of travel. The search corridor can be based, at least in part, on the route of travel, a mode of transportation, and a route deviation threshold. The display of the filtered search results can include a representation of the search corridor, the route of travel and each search result in the filter set of results.

In Example 32, the method of Example 31 can optionally include receiving user input from the interface, the user input highlighting a road within a map displayed as at least a portion of the interface, and generating the search corridor based at least in part on the user input received via the interface.

In Example 33, the method of any one of Examples 32 and 33 can optionally include receiving user input from the interface, the user input defining a first location and an second location, and generating, based on the first location and the second location, the route of travel.

In Example 34, the method of Example 33 can optionally include generating the route of travel by generating multiple routes of travel between the first location and the second location and receiving a selection from the multiple routes of the route of travel.

In Example 35, the method of any one of Examples 31 through 34 can optionally include receiving user input, via the mobile device, defining the route deviation threshold, the route deviation threshold in combination with the mode of transportation controlling the amount the search corridor is expanded around at least a portion of the route of travel.

In Example 36, the method of Example 35 can optionally include defining the route deviation threshold includes selecting between travel time and straight-line distance as a unit of measure, and options for entering the route deviation threshold in units corresponding to the selected unit of measure.

In Example 37, the method of any one of Examples 31 through 36 can optionally include displaying the filtered set of search results using an interactive icon displayed for each result of the filtered set of search results, and the interactive icon can be selected to display details on the search result and the associated geographic location.

In Example 38, the method of any one of Examples 31 through 37 can optionally include displaying the representation by displaying additional search result filters including a travel time filter, a price filter, and a merchant filter to enable a user to further manipulate the display of the filtered set of search results.

Example 39 can include a machine-readable storage medium that includes instructions for providing search results within a geographical search corridor. In this example, the machine-readable storage medium can include instructions that, when executed on a suitable machine, can cause the machine to perform any of the Examples 31 through 38.

Example 40 can include a mobile device for providing search results within a geographical search corridor. In this example, the mobile device can include a display and a processor coupled to a memory device. The memory device can include instructions that cause the mobile device to display an interface enabling a user to define a route of travel, access a search corridor, filter a plurality of search results, and display the search results. The search corridor can encompass at least a portion of the route of travel. The search corridor can be based at least in part on the route of travel, a mode of transportation, and a route deviation threshold. The search results can be filtered at least in part on the search corridor to obtain a filtered set of search results. Each of the plurality of search results can include an associated geographic location. The display can include a representation of the search corridor, the route of travel, and the filtered set of search results.

In Example 41, the mobile device of Example 40 can optionally include instructions that cause the mobile device to: receive user input from the interface, such as the user highlighting a road within a map displayed as at least a portion of the interface, and generate the search corridor based at least in part on the user input received via the interface.

In Example 42, the mobile device of any one of Examples 40 and 41 can optionally include instructions that cause the mobile device to: receive user input from the interface, defining a first location and an second location, and generate, based on the first location and the second location, the route of travel.

In Example 43, the mobile device of Example 42 can optionally include instructions that cause the mobile device to generate multiple routes of travel between the first location and the second location and receive a selection from among the multiple routes of the route of travel.

DETAILED DESCRIPTION

Example systems and methods for providing and using various location-enabled shopping functions are described. In an example, the systems and methods can provide data processing techniques for processing a search query to identify a set of search results relating to products and/or services that are being offered either online or via a brick-and-mortar retail store, and then present those search results in such a manner that conveys to the viewer in a simple and intuitive manner the distance and/or travel time between a location of the user, and a product or service presented within each individual search result associated with a brick-and-mortar store. In another example, the systems and methods can provide data processing techniques for establishing a search query, and then processing the search query to identify a set of search results that satisfy the search query, at least in part, because the search results are associated with brick-and-mortar stores that are in close proximity with a user-defined corridor, or commute route. In yet another example, the systems and methods can provide a navigated shopping service allowing a user to use a location-aware mobile device to shop en route to a desired destination. In an example, the navigated shopping service can work in coordination with registered merchants to provide convenient access to items on a user's shopping list with minimal disruption or deviation from a planned route.

In the following description, for purposes of explanation, numerous specific details are set forth in order to provide a thorough understanding of the various aspects of different embodiments of the present invention. It will be evident, however, to one skilled in the art, that the present inventive subject matter may be practiced without all of the specific details.

Consistent with some embodiments of the invention, a web-based search engine processes search queries and returns, to a requesting client computing device, search results that are arranged based at least in part on the travel time required to travel from a first location (e.g., the user's current location) to the location of a store at which a product or service associated with a search result is being offered. Accordingly, the search results may be presented such that the closest store (in terms of travel time) that is offering a product satisfying the search query is presented first in the list of search results. With some embodiments, the user can toggle the presentation of search results between distance and time, such that the search results can be ordered based on distance (e.g., the geodesic distance, or distance as the crow flies) or, the more practical and useful measure, based on the travel time required to travel between the location of the user and the location of the store offering the product or service presented in a search result. With some embodiments, the user can specify a mode of transportation (e.g., walking, biking, automobile, public transportation, etc.) and the travel time will be derived based on the routes available when travelling via the selected mode. With some embodiments, various filtering criteria may be applied. For example, the user may request that only search results satisfying the query and associated with a store that is within a predefined travel time, or distance, be presented. Similarly, a user may select one or more specific stores (e.g., Apple® Store, Best Buy®, Walmart®, and so forth) to see only search results showing products/services being offered by those stores.

With some embodiments, parameters for the search query may be established by a user interacting with a map. In particular, with some embodiments, a user may interact with a map to specify any one or more of: the starting location to be used for deriving the distance or travel time to the products or services associated with the individual search results; a specific geographical region of interest, from which to display search results; a corridor or commuting route from which any point along the corridor can be used as the starting point to derive the distance to a store associated with a search result. The map may be presented as part of a web-based map application, a desktop computer application, or an application that is specific to a particular mobile computing platform (e.g., such as Apple's iOS, or Google's Android operating systems.)

For instance, with some embodiments, a user may simply select a location on a map (using a pointing device, such as a mouse, or a finger or stylus with a touch screen display) to indicate his current location, or a location at which the user will be at some future time and from which the distance or travel time to another locations should be derived. With some embodiments, the user may define a circular region by simply dragging his or her finger or stylus (or taking a similar action with a pointing device) to specify a diameter, or radius, of a circle making up a circular region (see example illustrated in FIG. 8) from which search results should be presented. In other embodiments, the user may simply draw any closed shape to specify the region to be searched for local results. In yet other embodiments, the user may trace or highlight a specific road or set of roads that comprise a route that the user frequently travels. This route can then be used to identify stores associated with search results, such that those stores closest in distance or travel time to any point along the route can be presented.

With some embodiments, the search results may be shown in a simple list, with each individual result including any one or more of: a price at which a product or service is being offered; a store name (virtual online, or physical, e.g., local brick and mortar); a brief description of the product or service being offered; a physical distance from a user's location to the store at which the product or service is being offered; a link to share the listing with someone; a link to a map showing directions from the user's current location, or some user-specified location, to the store; a travel time indicating how long (in time) it would take the user to travel via a particular mode to the location of the store at which the product is being offered; and a quantity of a product being offered at the store. With some embodiments, search results for online virtual stores are shown separately from the search results for locally available products and/or services, while in some embodiments, the search results are intermingled, and/or arranged according to some other specific aspect or attribute, such as price. With some embodiments, a user may filter the search results to only view products and/or services: located at stores within a threshold distance; located at stores within a threshold travel time (where the mode of travel can be specified), that have prices that are less than, or exceed, some threshold price, and so forth.

With some embodiments, the search results may be presented via a multi-axis table, with each axis representing a single attribute of interest. For example, with some embodiments, the search results may be represented as graphics or icons presented along an X and Y axis with the X axis representing distance or travel time, and the Y axis representing price (see example user interface of FIG. 9). With such an embodiment, the user can very quickly get a sense of which local store is both closest (in distance and/or travel time), and has a product at a reasonable price relative to other stores. Other beneficial aspects of the embodiments of the present invention will be readily apparent from the description of the figures that follows.

Consistent with some embodiments of the invention, an application executing on a client computing device allows a user to interact with a user interface presented via the client computing device to provide one or more search terms for use in a search query to be executed against a set of marketplace listings hosted at a publication server system. The search query is then communicated to a search engine operating in conjunction with the publication server system, and processed to identify search results that satisfy the user-provided search terms. In addition to communicating the search term(s) as part of the search query, the client-computing device communicates to the search engine information identifying a corridor or route, such as the portions of one or more roads on which a user tends to travel as part of a daily commute. The search engine then processes the search query to identify the marketplace listings that satisfy the search query, and are associated with a brick-and-mortar store that is within some predefined distance of a point along the corridor or commute route.

With some embodiments, the information identifying the corridor or commute route is established by the user interacting with an interactive map that is part of the application that facilitates the search query. For example, with some embodiments, a user may select (e.g., with a finger or stylus on a touch sensitive display, or a pointing device with a conventional display) a starting location on a map, and then trace or drag his finger (or stylus, or pointing device) along a road, or set of roads, displayed in the map, thereby selecting or otherwise specifying a route frequently travelled by the user. With other embodiments, a software application may analyze location information generated by a location based device (e.g., a global positioning system (GPS) device) that is part of a mobile computing device. Accordingly, the corridor or commute route may be automatically determined by analysing the historical location information generated by the mobile computing device.

With some embodiments, the user may specify a threshold distance that s/he is willing to travel from his or her commute path to visit a store and obtain a product/service associated with a search result. Accordingly, only those search results that are associated with products/services being offered at locations within the predefined threshold will be displayed or presented. For example, the search engine will use the information identifying the corridor or commute path and the threshold distance to identify only the relevant search results. Alternatively, the search engine, or an application on the client computing device, will filter the search results to only display the relevant results (i.e., those satisfying the distance threshold defined by the user). With some embodiments, the search results are presented on a map, for example, as pins or icons positioned on the map in the location of the store associated with a product/service being offered via the search result. In such instances, the pins or icons are generally interactive, such that, when selected, additional information about a relevant product/service and/or store is presented.

In accordance with an example embodiment, a network-based system can provide a platform to provide both a navigated shopping service and integrated payment capabilities. In certain examples, the navigated shopping service and the payment service can be provided by separate systems. In some examples, the user interacts with a network-based system (e.g., navigated shopping service and/or payment service) via a mobile device, such as a smartphone, a tablet computing device, or an in-vehicle intelligent navigation system, among others. In an example, the network-based system can include a publication module capable of delivering location-based offers to a user based on stored user profile data, local merchant campaigns, and current or future location data. In certain examples, using the navigated shopping service can include configuring automatic payments via an integrated or partner payment processing system, such as the PayPal™ payment system (from eBay Inc. of San Jose, Calif.).

Example System

FIG. 1A is a block diagram depicting a system 100 for delivering search results, according to an example embodiment. The system 100 can include a user 110, a network-based publication system 120 with a search engine, and one or more merchants 130 (and merchant systems). In an example, the user 110 can connect to the network-based publication system 120 via a mobile device 115 (e.g., desktop, laptop, smart phone, PDA, or similar electronic device capable of some form of data connectivity). The network-based publication system 120 will receive and process a query from the user's mobile device 115. Generally, location information specifying the physical or geographical location of the user 110 will be received with the query. For example, the mobile device 115 can include a GPS unit to inform the mobile device 115 of its location, such that the location information of the mobile device 115 can be shared with the network-based publication system 120. Other known techniques for deriving location information may be used with both mobile and non-mobile client computing devices, for example, such as desktop computers, etc. For instance, with some embodiments, the location information indicating the location of the user 110 may be explicitly specified by the user 110, for example, by the user 110 interacting with a map.

In an example, the merchant 130 can operate computer systems, such as an inventory system 132 or a POS system 134. The network-based publication system 120 can interact with any of the systems 132, 134 used by merchant 130 for operation of the merchant's retail or service business. In an example, the network-based publication system 120 can work with both POS system 134 and inventory system 132 to obtain access to inventory available at individual retail locations run by the merchant 130. This inventory information can be used in both generating product or service listings, and selecting and ordering search results served by the network-based publication system 120.

Figure 1B:
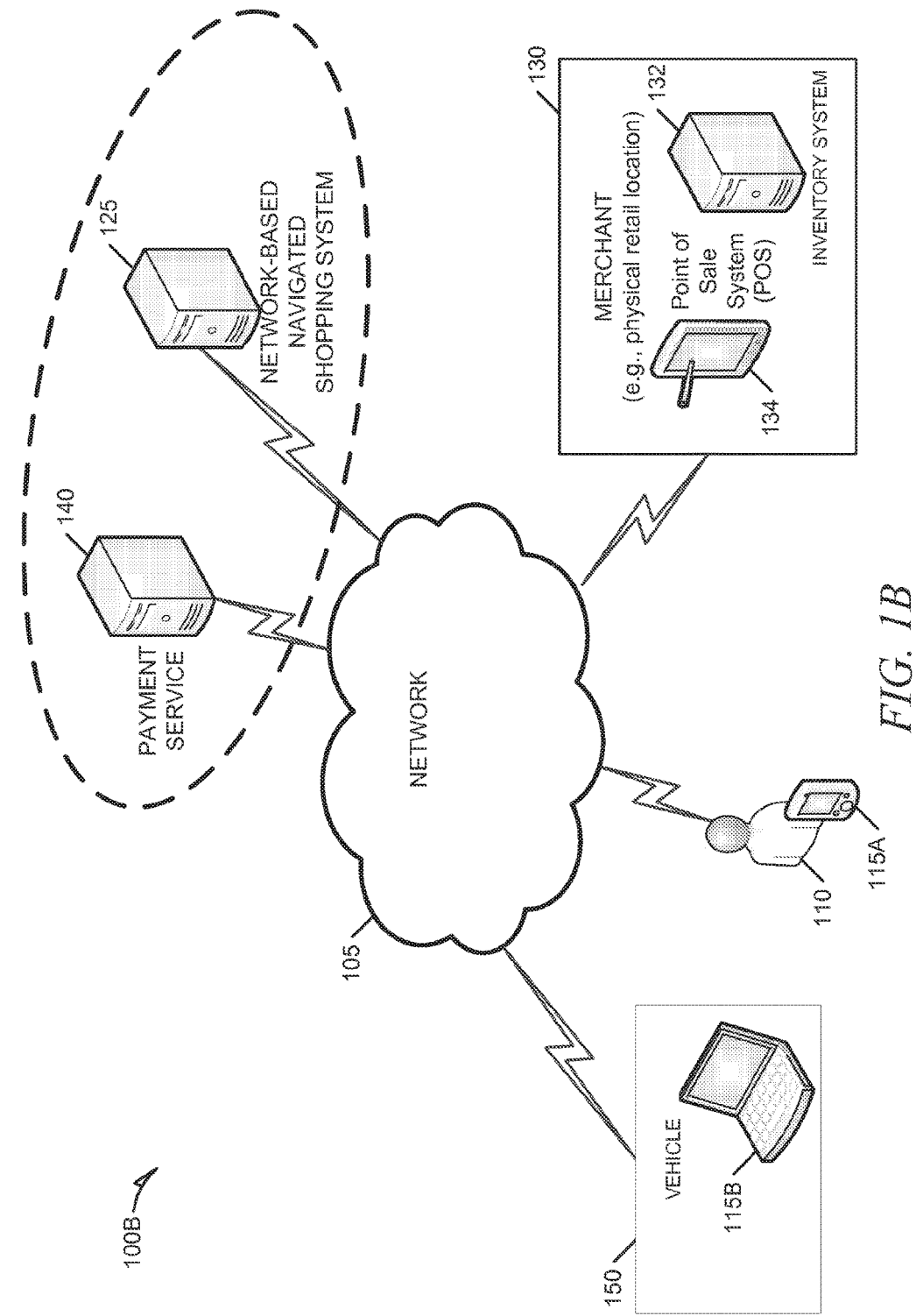
FIG. 1B is a block diagram depicting a system for providing a network-based navigated shopping service, according to an example embodiment.

FIG. 1B is a block diagram depicting a system 100B for providing a network-based navigated shopping service. The system 100B can include a vehicle 150, a user 110, a network-based navigated shopping service system 120 (also referred to as network-based shopping system 120), a merchant 130, and a network-based payment service 140. In an example, the user 110 can connect to the network-based shopping system 120 via a mobile device 115A (e.g., smart phone, PDA, laptop, or similar mobile electronic device capable of some form of data connectivity). In another example, a user, such as user 110, can be within a vehicle 150 and connect to the network-based navigated shopping system 125 via a mobile device 115B. In certain examples, the mobile device 115B can include an in-vehicle programmable navigation system. For simplicity, mobile device 115B and mobile device 115A will be referred to collectively as mobile device 115 (unless specifically noted, analogous to mobile device 115 illustrated in FIG. 1A). In an example, the merchant 130 can operate computer systems, such as an inventory system 132 or a point of sale (POS) system 134, among others. The network-based shopping system 125 can interact with any of the systems 132, 134 used by merchant 130 for operation of the merchant's retail or service business. In an example, the network-based shopping system 125 can work with both the POS system 134 and inventory system 132 to obtain access to inventory available at individual retail locations run by the merchant 130 and match merchandise to item desired by users of the network-based shopping service 125. Additionally, the network-based payment service 140 can also interact with the merchant 130 via the POS system 134, enabling the network-based shopping system 125 to provide payment services offered by the network-based payment service 140 and make payments directly to the merchant 130. In certain examples, the network-based shopping system 125 and the payment service 140 can be integrated.

Example Operating Environment

With some embodiments, the user may explicitly indicate or specify his current location for use in deriving a distance or travel time to stores offering products/services. However, with some embodiments, location information of the user may be derived with a mobile computing device of the user. In some additional embodiments, the user may explicitly indicate or specify his daily travelled commute route (or some other route) for use in determining a set of search results based on the distance or travel time to stores offering products/services. However, with some embodiments, location information (and particularly, the commute or travel path) of the user may be derived with a mobile computing device of the user.

Figure 2:
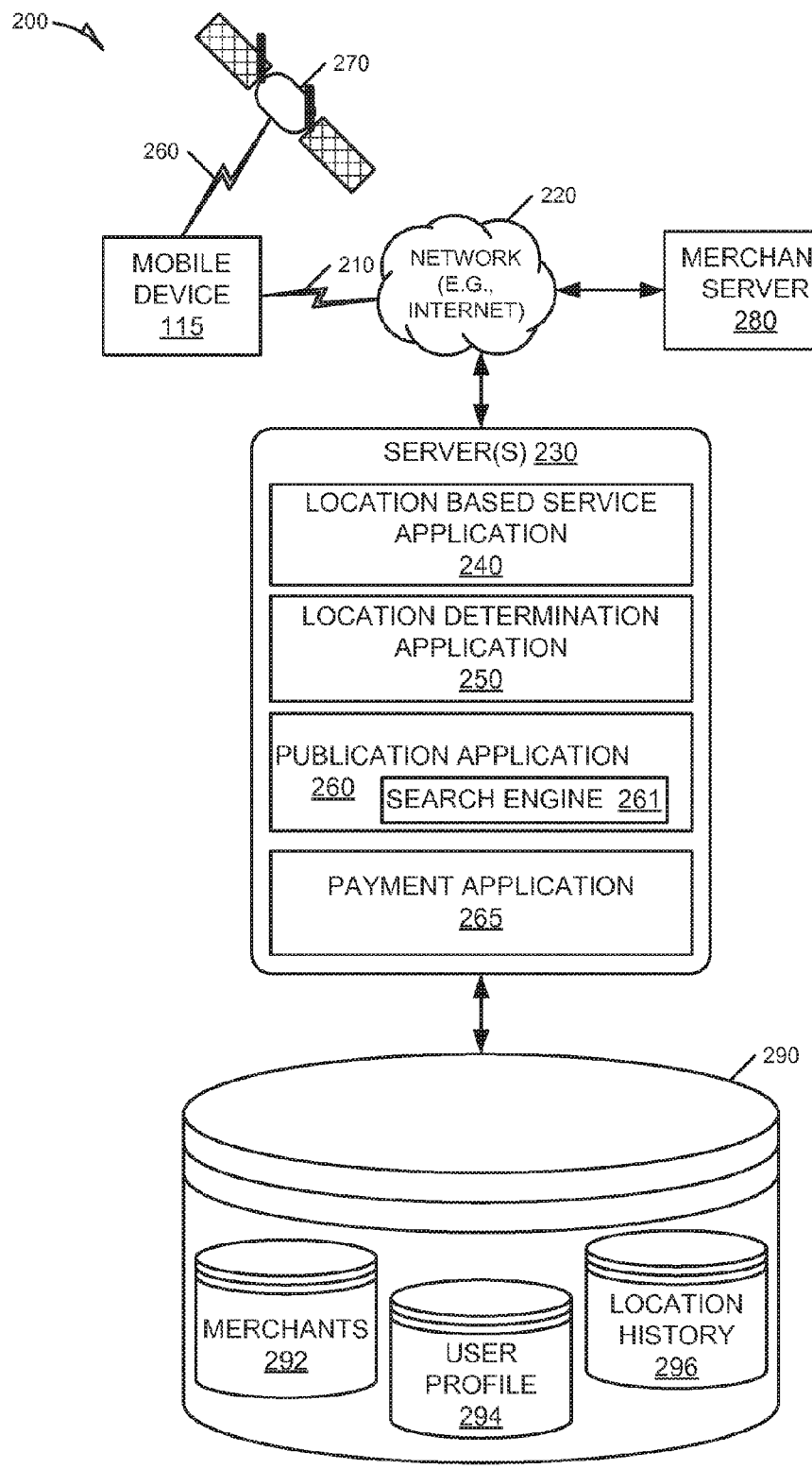
FIG. 2 is a block diagram illustrating an environment for operating a mobile device, according to an example embodiment.

FIG. 2 is a block diagram illustrating an environment 200 for operating a mobile device 115, according to an example embodiment. The environment 200 is an example environment within which methods of serving search results can be operated. In another example, environment 200 can host a navigated shopping service, which can also include the methods of serving search results discussed herein. The environment 200 can include a mobile device 115, a communication connection 210, a network 220, servers 230, a communication satellite 270, a merchant server 280, and a database 290. The servers 230 can optionally include location based service application 240, location determination application 250, publication application 260 with search engine 261, and payment application 265. The database 290 can optionally include merchant databases 292, user profile database 294, and/or location history database 296. The mobile device 115 represents one example device that can be utilized by a user to receive offers and share context information associated with the user. The mobile device 115 may be any of a variety of types of devices (for example, a cellular telephone, a PDA, a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers 230 may execute location based service (LBS) applications 240, which interoperate with software executing on the mobile device 115, to provide LBSs to a user. LBSs can use knowledge of the device's location, and/or the location of other devices and/or retail stores, etc., to provide location-specific information, recommendations, notifications, interactive capabilities, and/or other functionality to a user. With some embodiments, the LBS operates in conjunction with the publication application 260 and search engine 261, in particular, to provide search results that are arranged based on the distance or travel time between a mobile device 115 (or other computer device) and a retail store. For example, an LBS application 240 can provide location data to a network-based publication system 120, which can then be used to arrange a set of search results, based on distance and/or travel time between two locations. Knowledge of the mobile device's location, and/or the location of other devices, may be obtained through interoperation of the mobile device 115 with a location determination application 250 executing on one or more of the servers 230. Location information may also be provided by the mobile device 115, without use of a location determination application such as application 250. In certain examples, the mobile device 115 may have some limited location determination capabilities that are augmented by the location determination application 250.

Example Mobile Device

Figure 3:
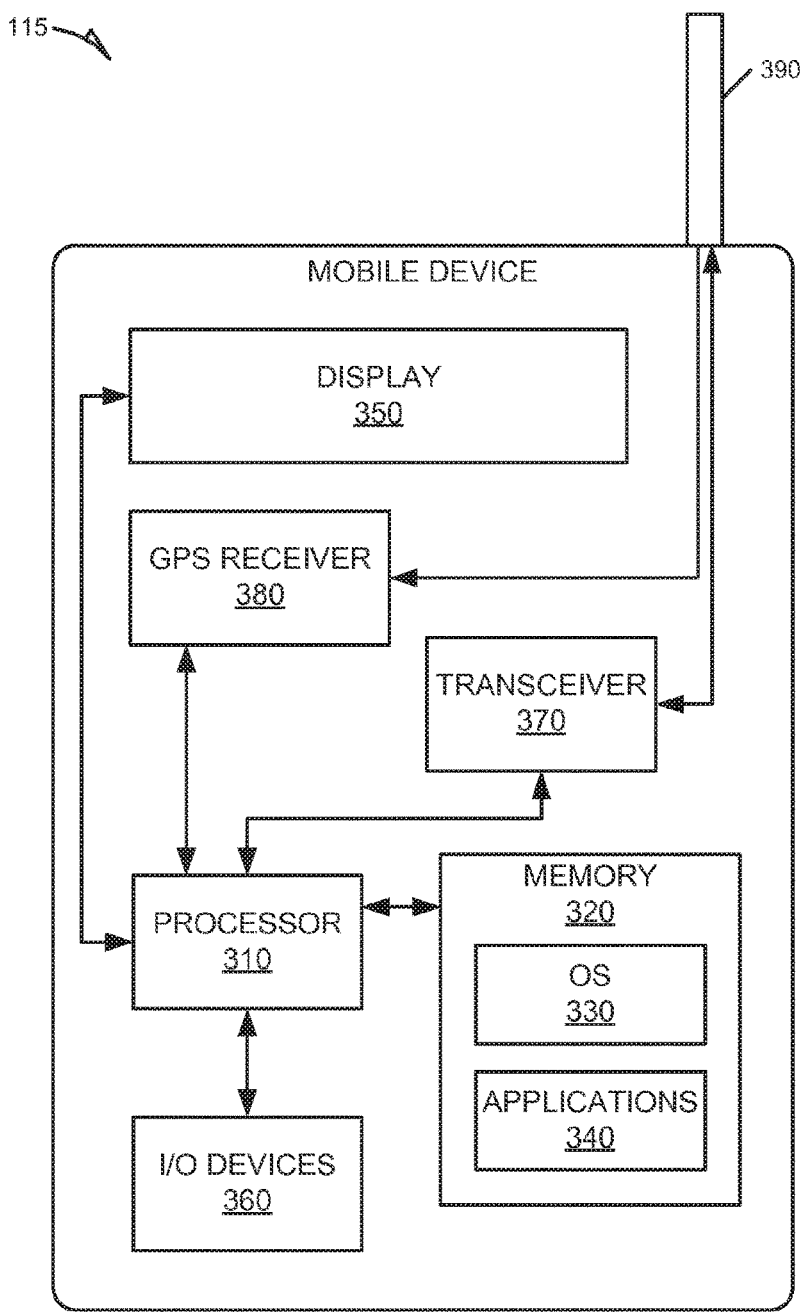
FIG. 3 is a block diagram illustrating a mobile device, according to an example embodiment.

FIG. 3 is a block diagram illustrating the mobile device 115, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor 310. The memory 320 may be adapted to store an operating system (OS) 330, as well as application programs 340, such as a mobile location enabled applications that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Additional detail regarding providing and receiving location-based services can be found in U.S. Pat. No. 7,848,765, titled "Location-Based Services," granted to Phillips et al. and assigned to Where, Inc. of Boston, Mass., which is hereby incorporated by reference.

An example geo-location concept discussed within U.S. Pat. No. 7,848,765 is a geofence. A geofence can be defined as a perimeter or boundary around a physical location or mobile object (e.g., a user). A geofence can be as simple as a radius around a physical location defining a circular region around the location. However, a geofence can be any geometric shape or an arbitrary boundary drawn on a map. A geofence can be used to determine a geographical area of interest for the calculation of demographics, advertising, presenting search results, or similar purposes. Geofences can be used in conjunction with identifying and presenting search results, as described herein. For example, a geofence can be used to assist in determining whether a user (or mobile device associated with the user) is within a geographic area of a particular merchant. If the user is within a geofence established by the merchant or the publication system, the systems discussed herein can use that information to identify and present search results (e.g., via a mobile device associated with the user).

Example Platform Architecture

Figure 4:
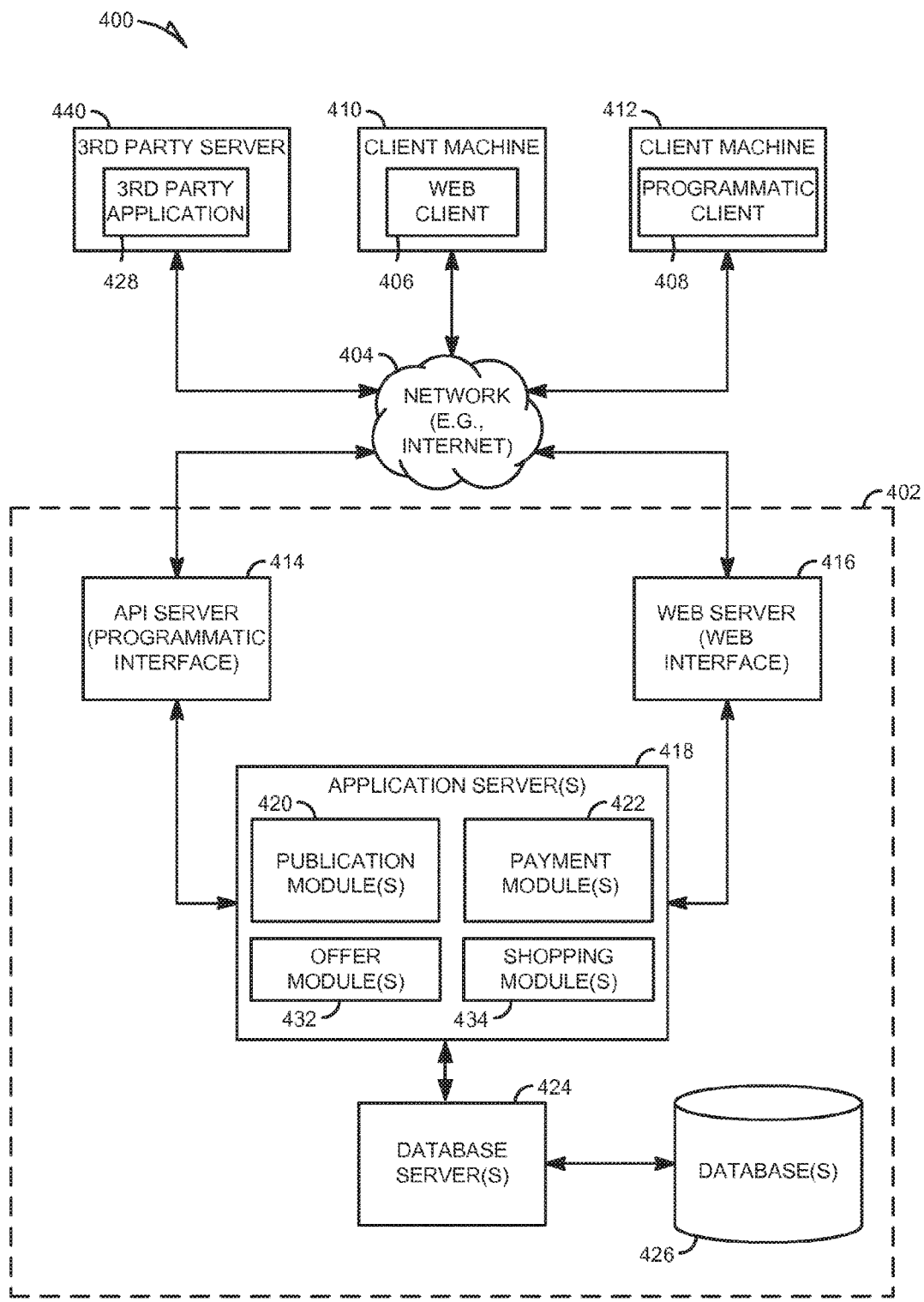
FIG. 4 is a block diagram illustrating a network-based system for delivering search results arranged by distance and/or time and/or navigated shopping services, according to an example embodiment.

FIG. 4 is a block diagram illustrating a network-based system 400 for processing a search query, and presenting search results, as described more fully herein. The network-based system 400 can also provide navigated shopping services as described more fully herein. The block diagram depicts a network-based system 400 (in the exemplary form of a client-server system), within which an example embodiment can be deployed. A networked system 402 is shown, in the example form of a network-based location-aware publication, advertisement, or marketplace system, that provides server-side functionality, via a network 404 (e.g., the Internet or WAN) to one or more client machines 410, 412. FIG.

4 illustrates, for example, a web client 406 (e.g., a browser, such as the Internet Explorer browser developed by Microsoft Corporation of Redmond, Wash. State) and a programmatic client 408 executing on respective client machines 410 and 412. In an example, the client machines 410 and 412 can be in the form of a mobile device, such as mobile device 115.

An Application Programming Interface (API) server 414 and a web server 416 are coupled to, and provide programmatic and web interfaces respectively to, one or more application servers 418. The application servers 418 host one or more publication modules 420 (in certain examples, these can also include search engine modules, commerce modules, advertising modules, and marketplace modules, to name a few), payment modules 422, dynamic offer modules 432, and optionally shopping modules 434. The application servers 418 are, in turn, shown to be coupled to one or more database servers 424 that facilitate access to one or more databases 426. In some examples, the application server(s) 418 can access the database(s) 426 directly without the need for a database server(s) 424.

The publication modules 420 may provide a number of publication and search functions and services to users that access the networked system 402. The payment modules 422 may likewise provide a number of payment services and functions to users. The payment modules 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 may also be configured to present or facilitate a redemption of offers, generated by the location-aware (dynamic) offer modules 432, to a user during checkout (or prior to checkout, while the user is still actively shopping). The offer modules 432 may provide dynamic context sensitive offers (e.g., coupons or immediate discount deals on targeted products or services) to users of the networked system 402. The offer modules 432 can be configured to use all of the various communication mechanisms provided by the networked system 402 to present offer options to users. The offer options can be personalized based on current location, time of day, user profile data, past purchase history, or recent physical or online behaviors recorded by the network-based system 400, among other things (e.g., context information). While the publication modules 420, payment modules 422, and offer modules 432 are shown in FIG. 4 to all form part of the networked system 402, it will be appreciated that, in alternative embodiments, the payment modules 422 may form part of a payment service that is separate and distinct from the networked system 402. Additionally, in some examples, the offer modules 432 may be part of the payment service or may form an offer generation service separate and distinct from the networked system 402.

In certain examples, the shopping modules 434 may provide real-time navigation route updates listing physical retail outlets that have items on a shopping list uploaded by a user of the networked system 402. The shopping modules 434 can be configured to use all of the various communication mechanisms provided by the networked system 402 to transmit information to a client machine, such as client machine 412. The shopping modules 434 can also present special offers available from retail merchants, such as merchant 130, along a user's current navigation route. The offers can be personalized based on current location, time of day, user profile data, past purchase history, or recent physical or online behaviors recorded by the network-based system 400, among other things.

Further, while the system 400 shown in FIG. 4 employs a client-server architecture, the present invention is of course not limited to such an architecture, and could equally well find application in a distributed, or peer-to-peer, architecture system, for example. The various publication modules 420, payment modules 422, and offer modules 432 could also be implemented as standalone systems or software programs, which do not necessarily have networking capabilities.

The web client 406 accesses the various publication modules 420, payment modules 422, and offer modules 432 via the web interface supported by the web server 416. Similarly, the programmatic client 408 accesses the various services and functions provided by the publication modules 420, payment modules 422, and offer modules 432 via the programmatic interface provided by the API server 414. The programmatic client 408 may, for example, be a smartphone application that enables users to communicate search queries to the system 400 while leveraging user profile data and current location information provided by the smartphone or accessed over the network 404.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the offer modules 432 for configuration purposes. In certain examples, merchants can use programmatic interfaces provided by the API server 414 to develop and implement rules-based pricing schemes that can be implemented via the publication modules 420, payment modules 422, offer modules 432, and optionally shopping modules 434.

Example Shopping Modules

Figure 5:
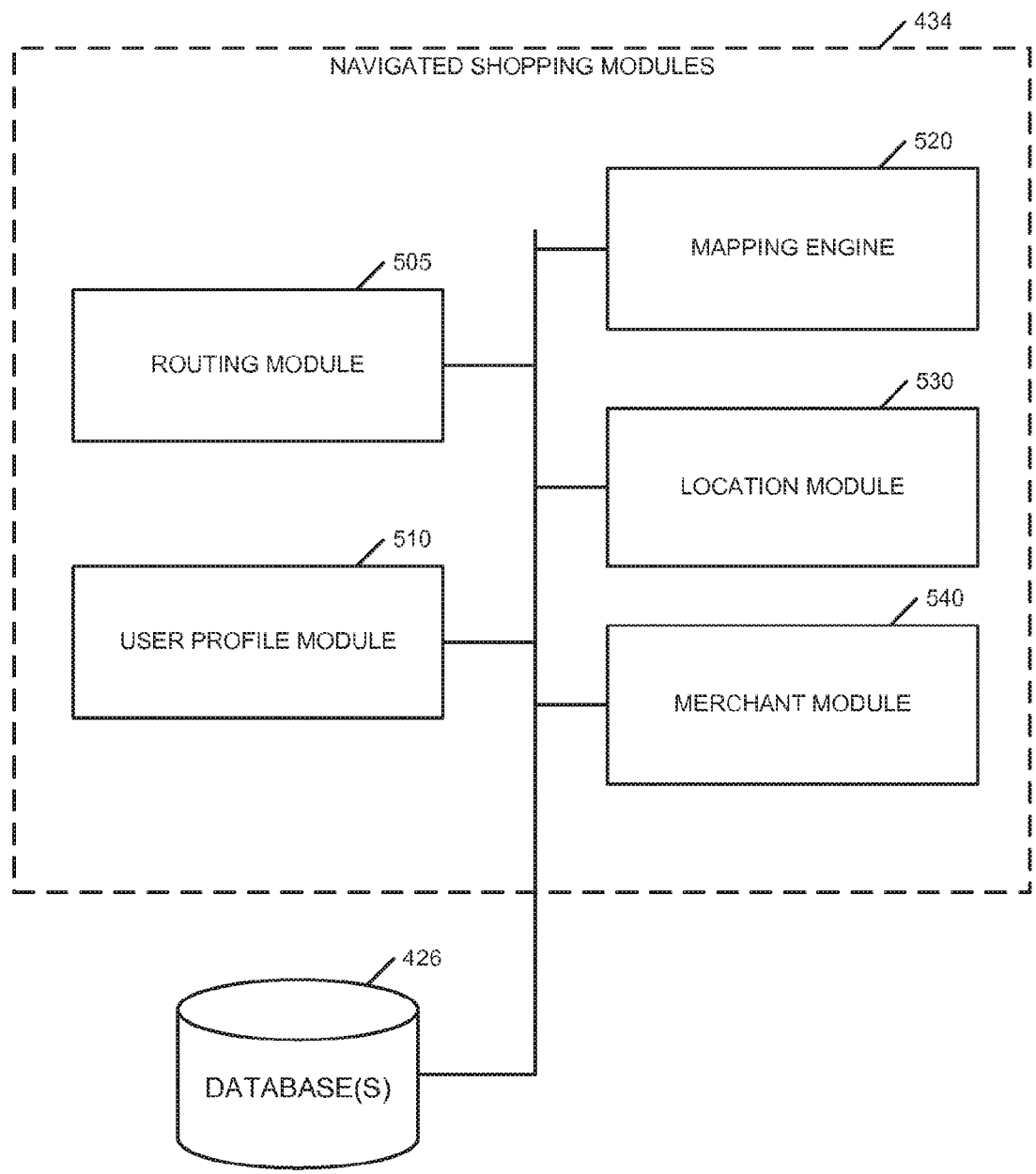
FIG. 5 is a block diagram illustrating shopping modules, according to an example embodiment.

FIG. 5 is a block diagram illustrating shopping modules 434, according to an example embodiment. In this example, the shopping modules 434 can include a routing module 505, a user profile module 510, a mapping engine 520, a location module 530, and a merchant module 540. In an example, the payment modules 422 can access database 426 to store and/or retrieve payment transaction data, user profile data, and location data, as well as other information to enable navigated shopping, such as merchant inventory data, among other things.

The routing module 505 can use information obtained from a user, the location module 530, and the merchant module 540 to create a shopping route that allows a user to purchase items of interest along a navigation route. The routing module 505 can process merchant location information, inventory information, use location information, and navigation route information to develop shopping routes.

The user-profile module 510 can manage user preferences, shopping lists, and recent destinations, among other things. In an example, the user-profile module 510 can communicate with database 426 and well as directly with a client machine, such as client machine 412.

The merchant module 540 can manage communications with merchants registered to offer goods or services, such as merchant 130, via the networked system 402. The merchant module 540 can maintain location data and real-time inventory for participating merchants.

The location module 530 can monitor real-time location information on clients, such as by monitoring (or receiving) location information regarding client machines, such as client machine 410. The location module 530 can communicate real-time location information to the routing module 505 and the mapping engine 520 as needed.

The mapping engine 520 can work with the routing module 505, location module 530, user-profile module 510, and merchant module 540 to map a location associated with the user, desired route, as well as merchant retail locations selling desired items.

Additional details regarding the functionality provided by the shopping modules 434 are detailed below in reference to FIG. 12 and FIG. 13.

Example Search Query Methods

Figure 6:
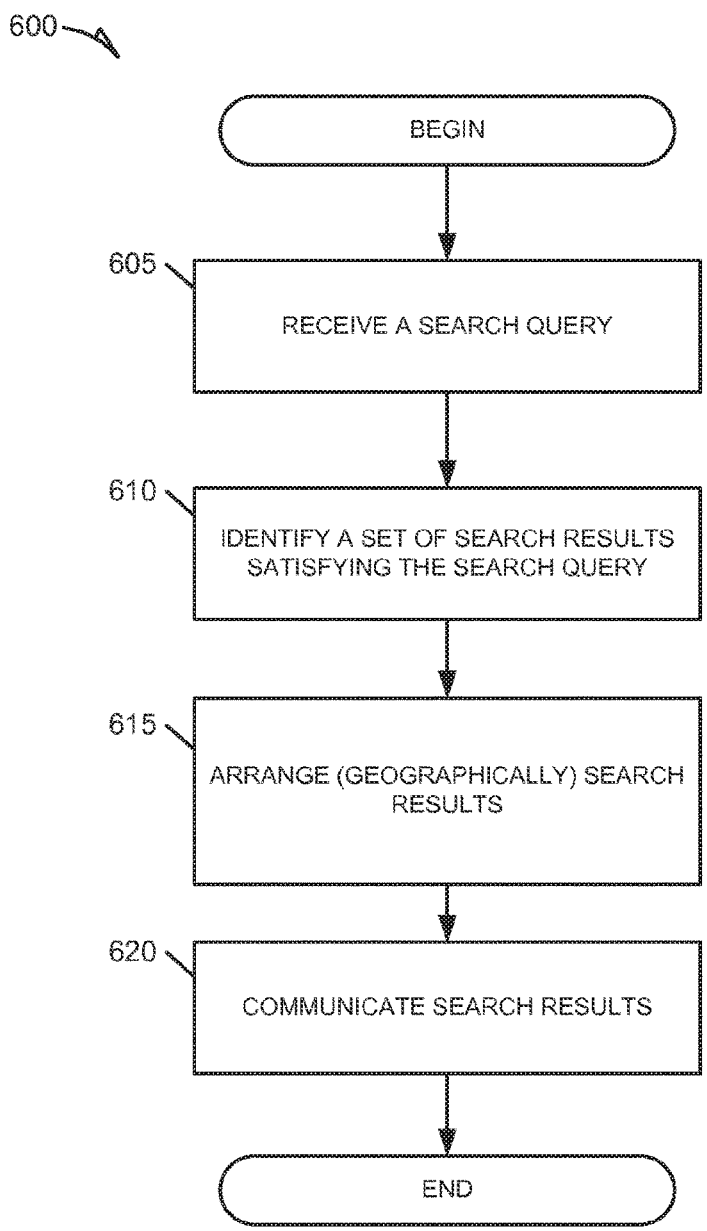
FIG. 6 is a flowchart illustrating a method for processing a search query, according to an example embodiment.

FIG. 6 is a flowchart illustrating a method 600 for processing a search query, according to an example embodiment. In an example, the method 600 can include operations such as: receiving a search query at operation 605, identifying search results at operation 610, arranging search results at operation 615, and communicating the search results at operation 620. In an example, the method 600 can begin at operation 605 with the networked system 402 receiving a search query from a client, such as client machine 410. The search query can include location information associated with the client device, such as location information from a location-enabled mobile device (e.g., mobile device 115). At operation 610, the method 600 can continue with the networked system 402 identifying a set of search results satisfying the search query. In an example, the search results can include geographic information associated with each result. At operation 615, the method 600 can continue with the networked system 402 arranging the search results according to predetermined criteria. In an example, the networked system 402 can arrange the search results geographically based on a physical brick-and-mortar store (e.g., retail location) in reference to a location associated with a mobile device of the user requesting the results. In an example, the search results can be arranged based on travel time from the mobile device location. In another example, the search results can be arranged based on distance from the mobile device location. At operation 620, the method 600 can conclude with the networked system 402 communicating the search results to a user device, such as mobile device 115, for display. In an example, the search results can be displayed in a map view. In another example, the search results can be displayed in a list view, sorted according to the arrangements discussed above. Additional display options are discussed below in reference to the example user-interfaces.

Example Search Query User Interfaces

Figure 7:
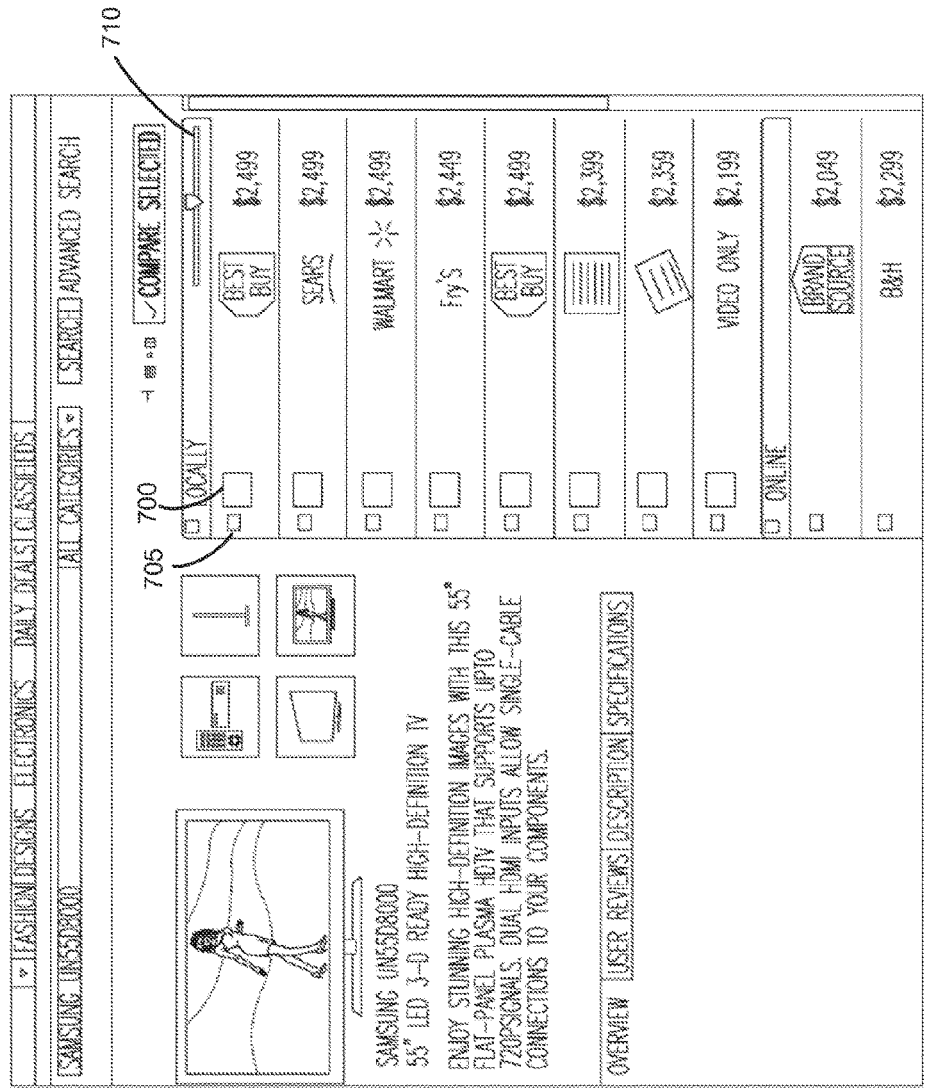
FIG. 7 illustrates an example user interface showing search results presented consistent with some embodiments of the invention.

FIG. 7 illustrates an example user interface showing search results presented consistent with some embodiments of the invention. In the example user interface of FIG. 7, the search results are grouped according to their type, for example, search results associated with virtual or online stores, and search results associated with local brick-and-mortar stores. In addition to showing information associated with a product satisfying the search query, the individual listings for the local brick-and-mortar stores are arranged according to the time needed for the user to travel from his current location to the store at which the product is being offered. For example the top search result in the list for local brick-and-mortar stores indicates that the product, (e.g., the TV) is being offered by Best Buy for $2499. The travel time to the particular Best Buy where the product is being offered is 5 min., as indicated by the graphic with reference number 700. In addition, the example user interface shows the address of the store, a telephone number for the store, and store hours. Also, the user can select the checkbox with reference number 705 to have the store location shown on a map. For example, with some embodiments, by checking or selecting one or more of the check boxes associated with each product or service listing, the user can indicate that he would like to view the location of the stores offering the product or service on a map.

As illustrated in FIG. 7, the user interface includes a slider mechanism 710 that serves as a filter, allowing the user to filter the search results by travel time. In this example the user has positioned the slider mechanism so that only local search results that are within 60 min. of the user's current location are presented in the search results page.

Figure 8:
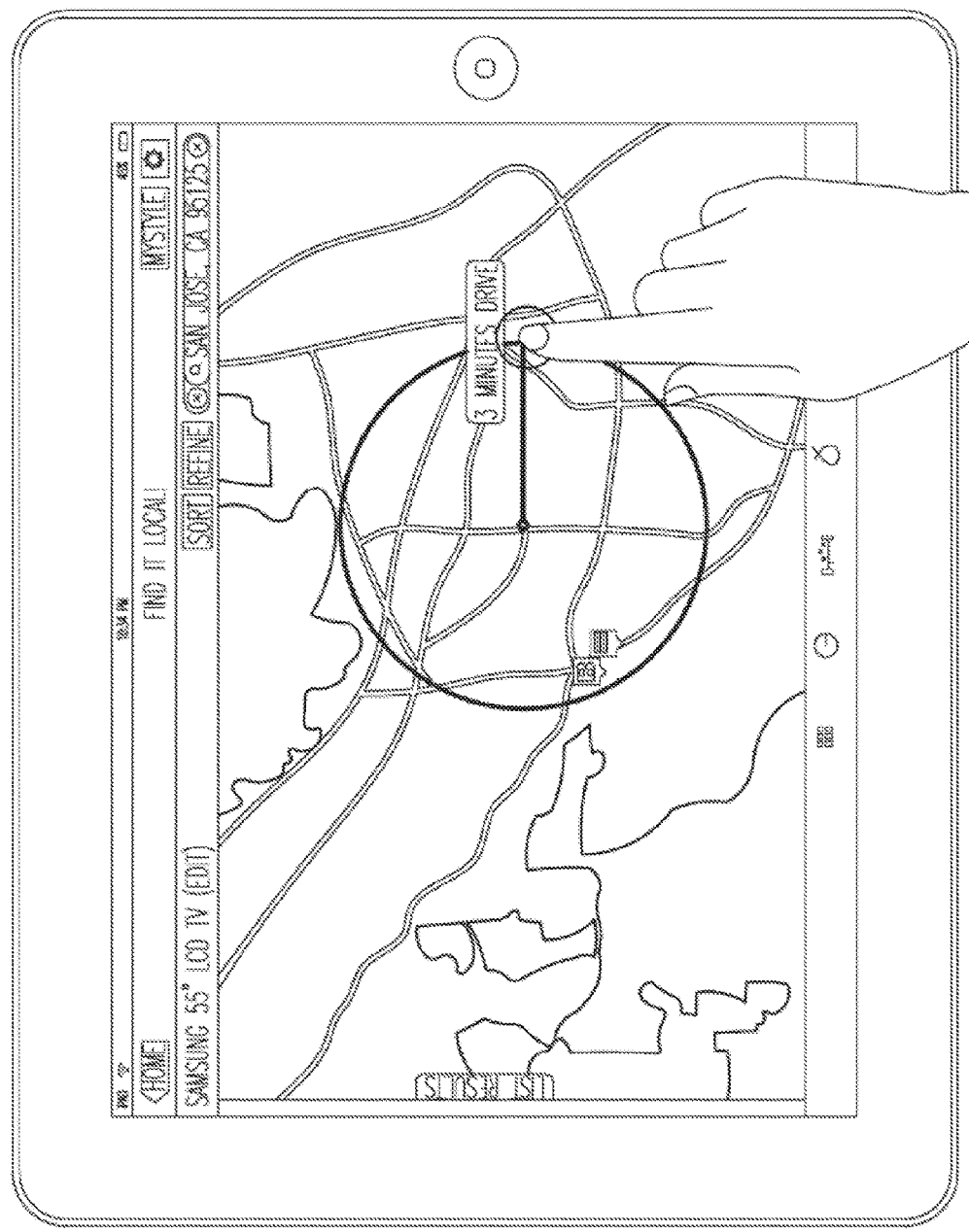
FIG. 8 illustrates an example user interface of an application for a mobile device including an interactive map on which search results can be shown, according to some embodiments of the invention.

FIG. 8 illustrates an example user interface of an application for a mobile device including an interactive map on which search results can be shown, according to some embodiments of the invention. As illustrated in FIG. 8, the user can indicate a geographical region of interest. In this example the user has simply placed his finger in a first location on the map and then dragged his finger to generate a circle, which will serve as the geographical area of interest for purposes of filtering and presenting the search results. Assuming the user selects the center of the circle as his current location, the user will be presented with a quick visual presentation of the locations of products being offered in the search results. Selecting an icon representing a search result may cause a pop-up window to present more detailed information about the store and/or the product being offered via the search result for that store. Several navigational icons are shown at the bottom of the page allowing the user to very quickly switch to alternative user interfaces. For example by selecting a particular icon the user can have the search results presented in a list, as shown in FIG. 7. Another navigational icon allows the user to view a multi-axis display of the search results, as shown and described in FIG. 9.

Figure 9:
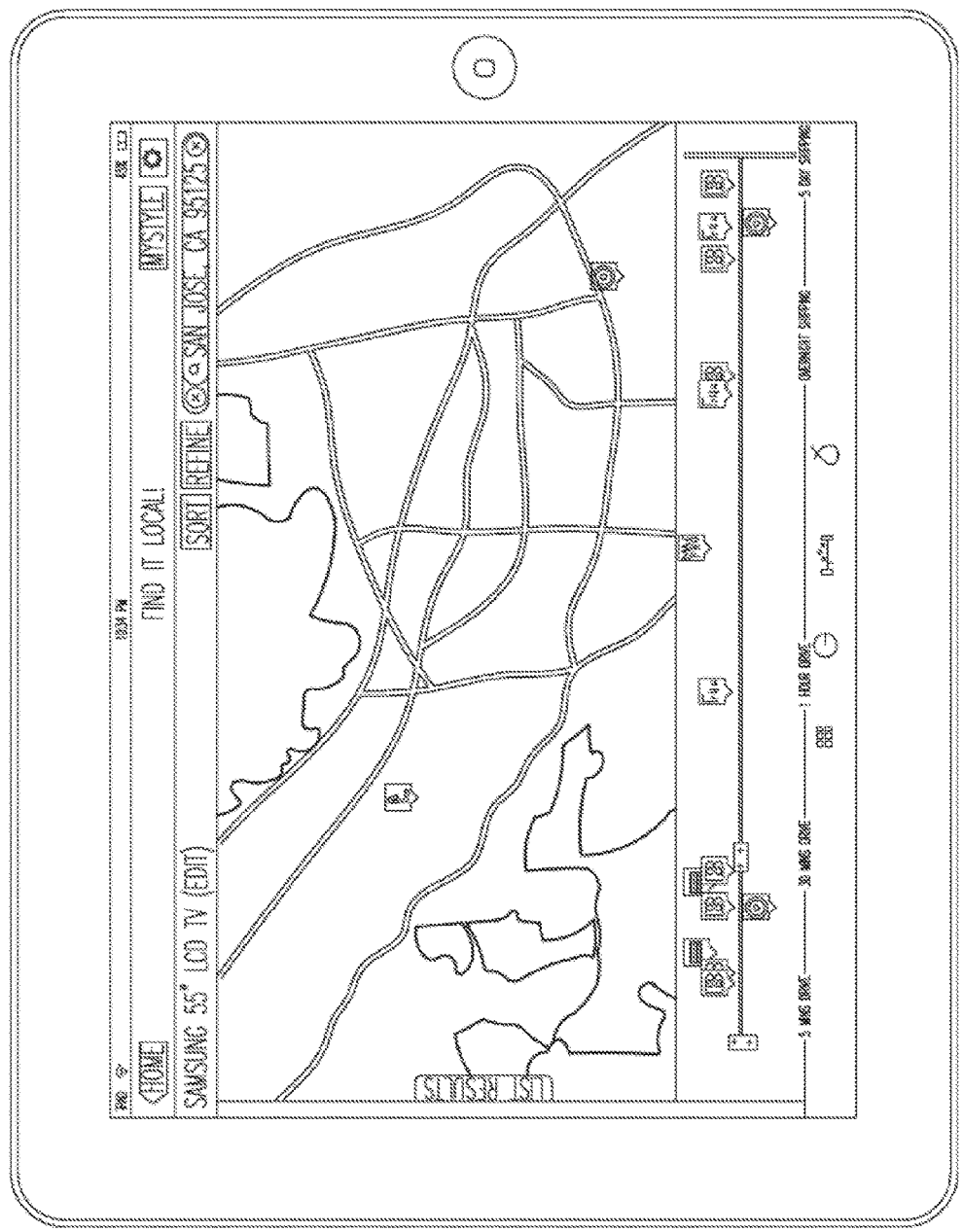
FIG. 9 illustrates a user interface showing a map, and having a multi axis table presenting the search results arranged by a combination of their price and distance and or travel time, according to an example embodiment of the invention.

FIG. 9 illustrates an example user interface showing a map, and having a multi-axis table presenting the search results arranged by a combination of their price and distance and/or travel time. In this example, the vertical axis, or Y axis, represents the price of the products or services. The horizontal axis, or X axis, represents the distance, or travel time, from the user's current location to the location at which the product or service can be obtained. As such, the user can very quickly and easily weigh the trade-offs between price and travel time to identify a local store that is both close in terms of travel time and offering the product at a reasonable price relative to the other stores.

Figure 10A:
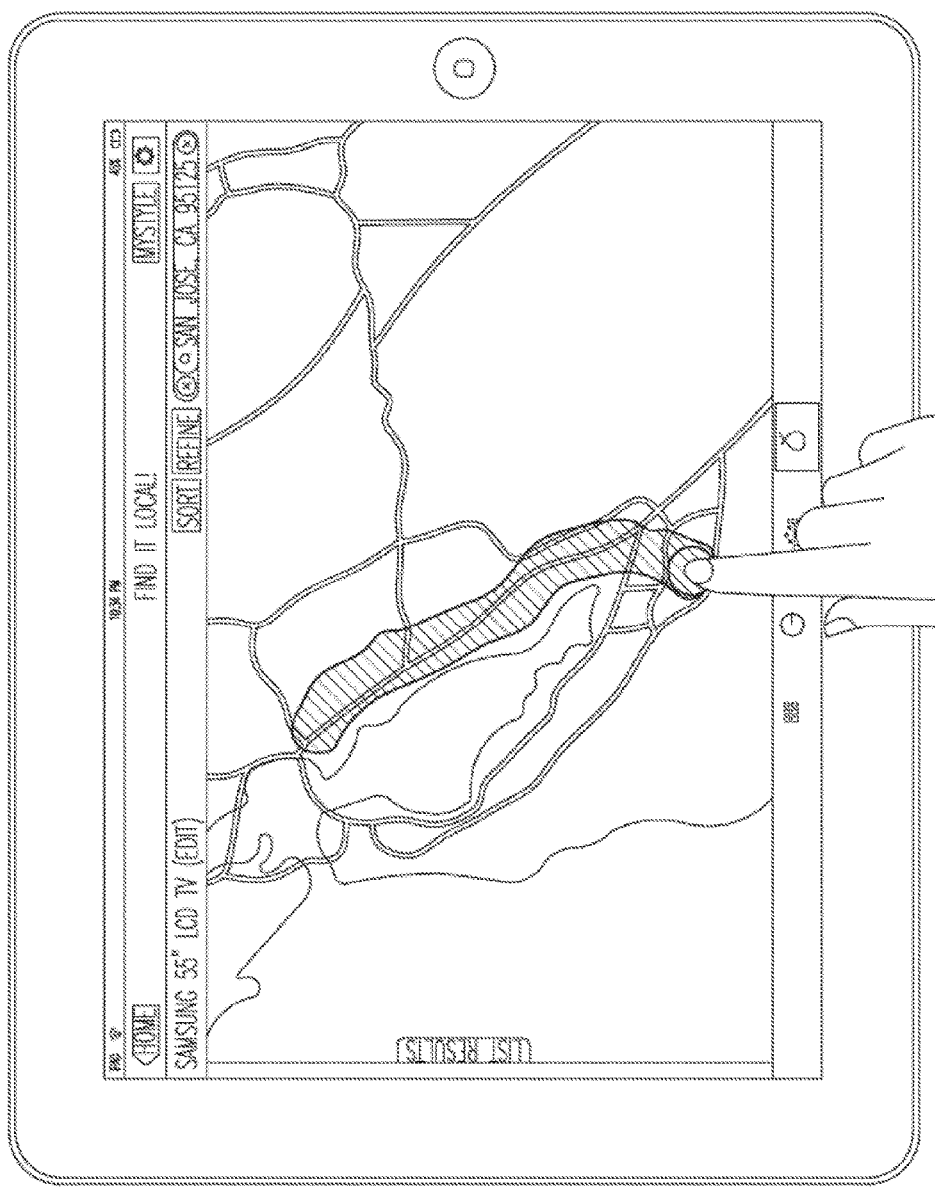
FIGS. 10A-C illustrates example user interfaces presenting an interactive map on a tablet or mobile computing device for use in defining a corridor or route with which to identify or filter relevant search results, according to some embodiments of the invention.

FIG. 10A illustrates another example user interface presenting an interactive map on a tablet or mobile computing device for use in defining a corridor or route with which to identify or filter relevant search results, according to some embodiments of the invention. For example, as illustrated in FIG. 10A, a user may use a finger or stylus to designate or select a road, or set of roads, as a corridor or commute route of interest for purposes of a particular search for a product or service. By simply dragging his finger along the route, the application will identify a road, and then highlight the road to indicate the selected corridor or route of interest.

Figure 10B:
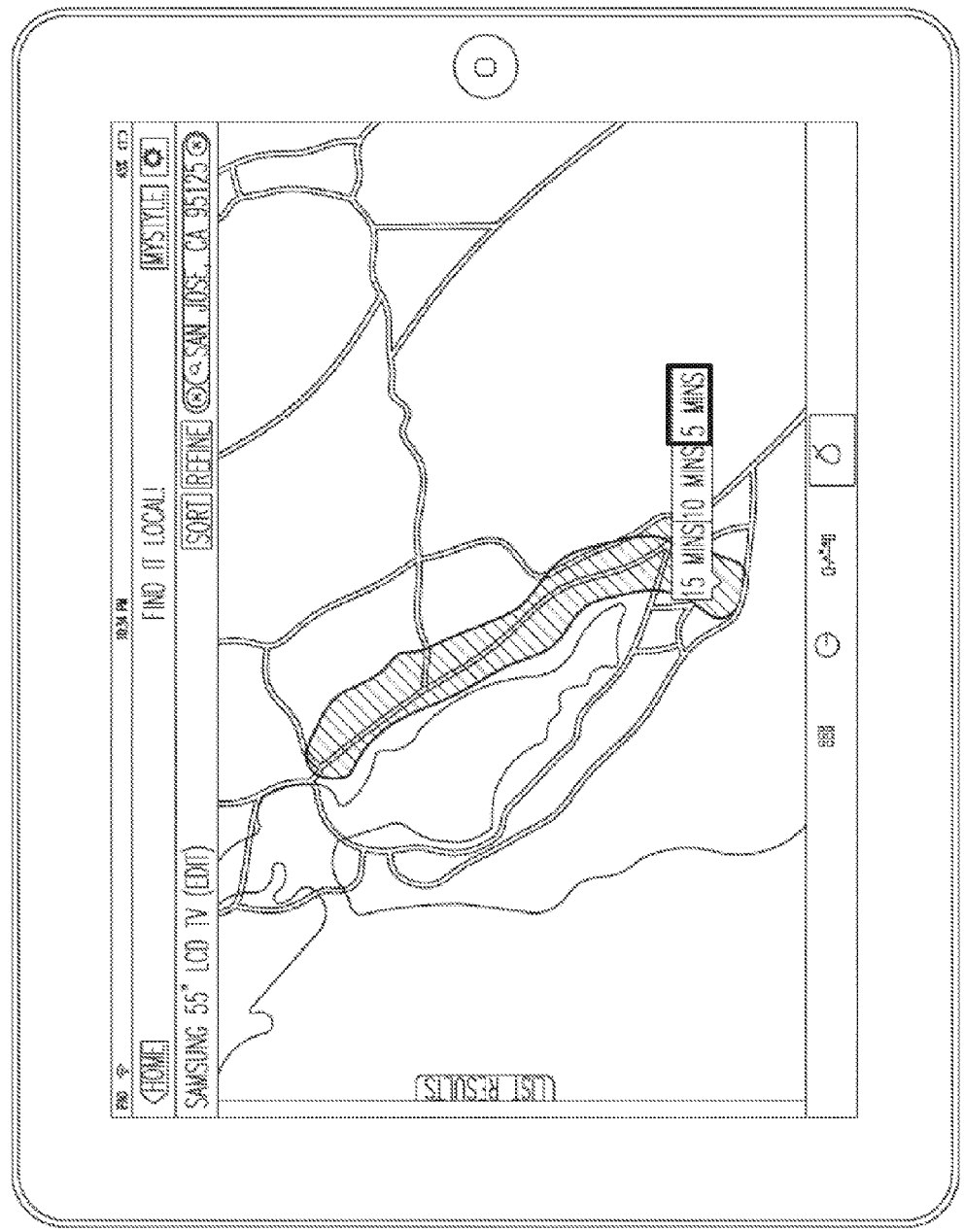
Figure 10C:
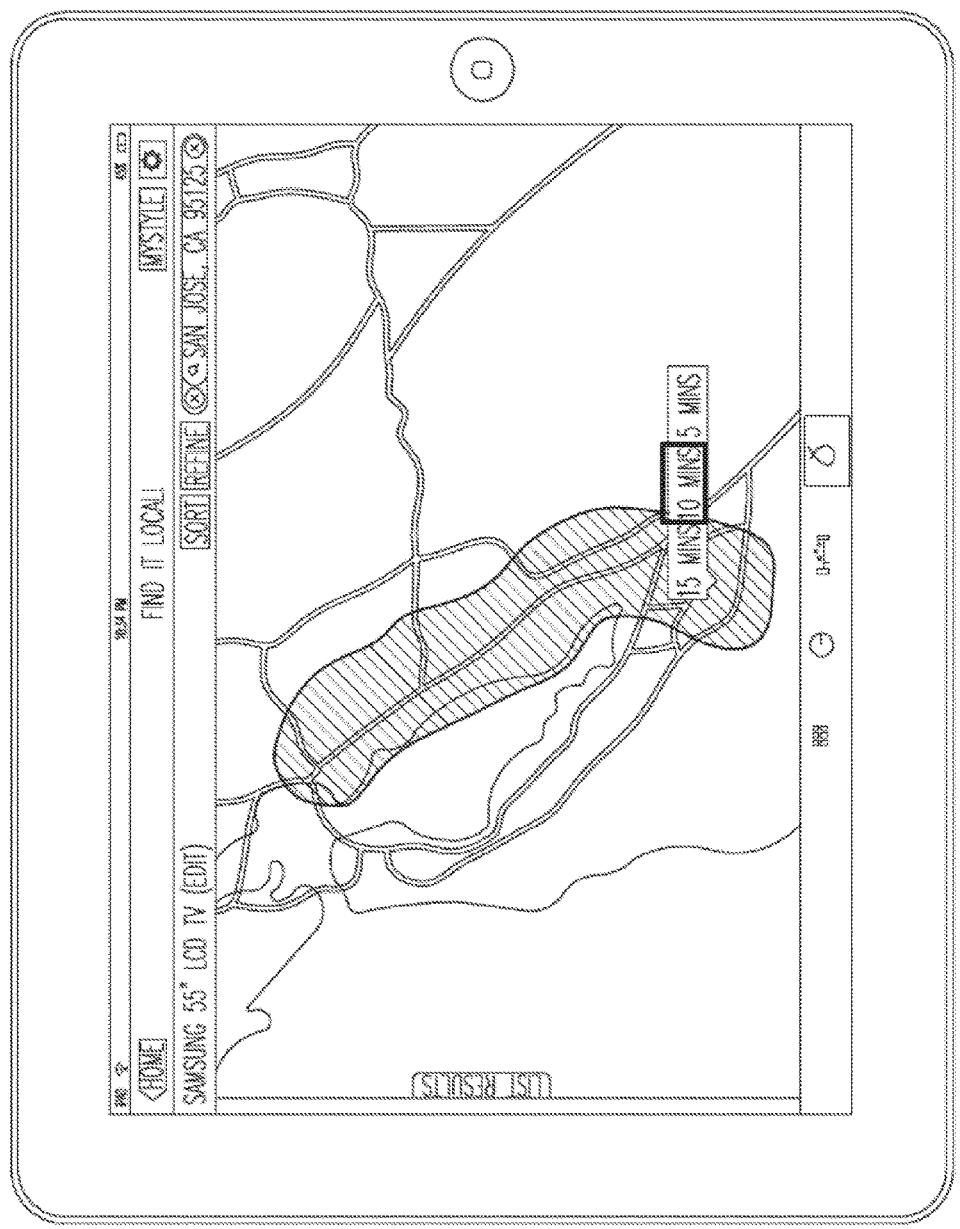

After selecting or otherwise specifying a particular road, or set of roads, the user can specify a distance that he is willing to travel from the route to obtain the particular product or service being searched for. For instance, as illustrated in the example user interface of FIGS. 10B and 10C, the user can select one of the three icons or buttons labelled, "15 Mins", "10 Mins", or "5 Mins" to indicate the time the user is willing to travel away from the defined corridor or commute path to obtain a relevant product or service (FIG. 10B illustrating the 5 Mins selection and corresponding corridor, and FIG. 10C illustrating the 10 Mins selection and corresponding corridor). Of course, a wide variety of other techniques could be used to establish the threshold distance or travel time. With some embodiments, upon a threshold distance or travel time being selected, the map is updated to indicate the general geographical area that is within proximity of the corridor or commute path. For example, as illustrated in FIG. 10C, the corridor or commute path is shown to be a width consistent with the user's defined threshold travel time of 10 minutes.

Once the user has defined the corridor and the threshold distance or travel time, the search engine will process the search query, or filter previously identified search results, to identify only those search results that are relevant because they are associated with a store that is located within the geographical area defined by the corridor and threshold distance (or travel time). For example, as illustrated in the example user interface of FIG. 11, several icons (or pins) representing stores associated with a particular search result are shown to be positioned within the highlighted corridor. By selecting a particular pin or icon, the user can learn more about the product/service being offered at the particular store represented by the pin/icon, and/or about the store itself—such as the actual address of the store, telephone number of the store, store hours for the store, and distance (or travel time) from the defined corridor.

Example Navigated Shopping Methods

Figure 12:
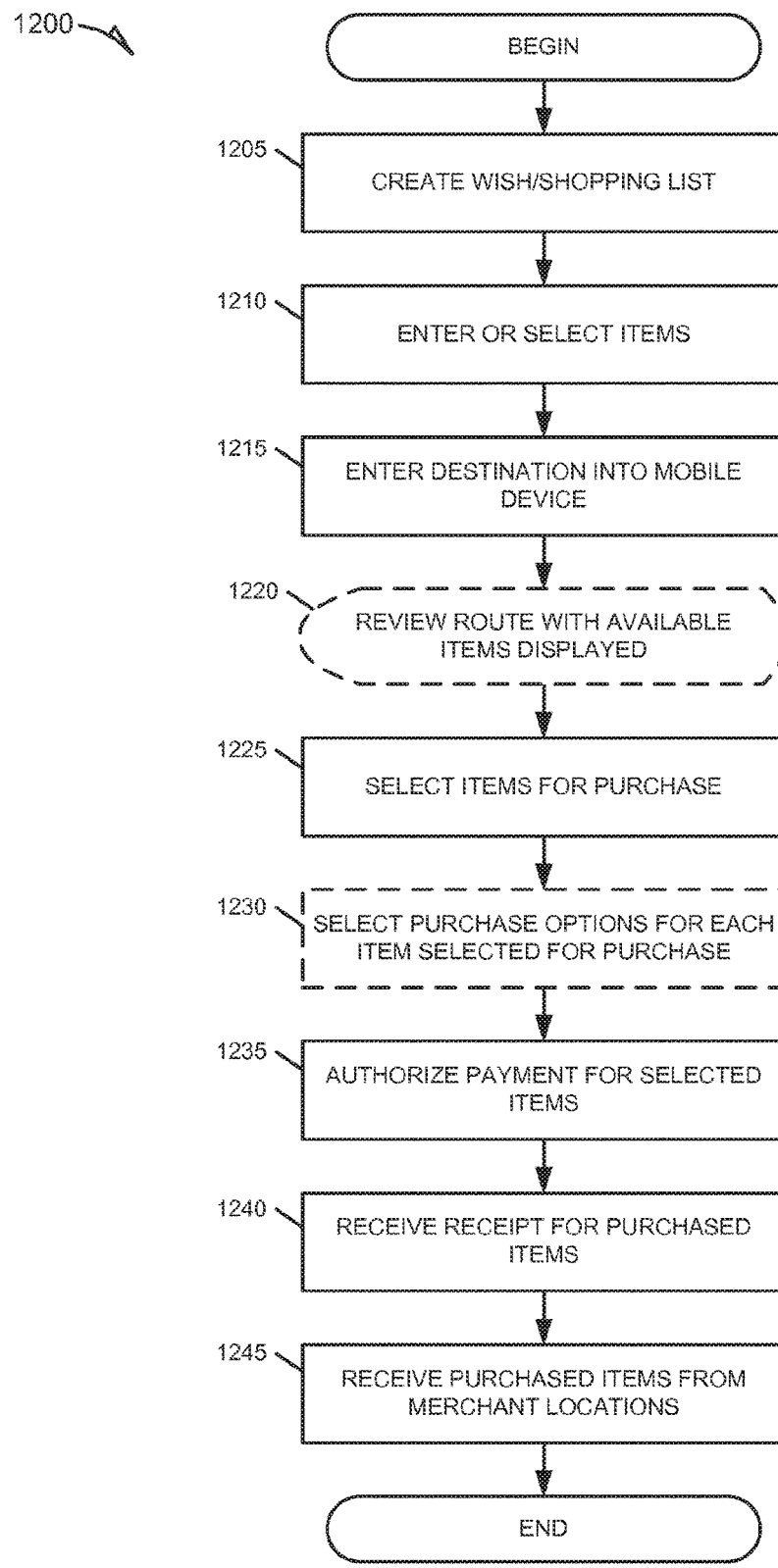
FIG. 12 is a flowchart illustrating a method for navigated shopping, according to an example embodiment.

FIG. 12 is a flowchart illustrating a method 1200 for navigated shopping, according to an example embodiment. In an example, the method 1200 can include operations such as: creating a shopping list at operation 1205, selecting items at operation 1210, entering a destination at operation 1215, selecting items for purchase at operation 1225, authorizing payment for selected items at operation 1235, receiving a receipt for selected items at operation 1240 and receiving purchased items from merchant locations at operation 1245. Optionally, the method 1200 can also include operations such as: reviewing route at operation 1220 and selecting purchase options at operation 1230. In an example, the method 1200 is performed via a mobile device, such as mobile device 115.

In an example, the method 1200 can begin at operation 1205 with a user creating a wish or shopping list via mobile device 115. In another example, the user can create a shopping list via a web browser running on client machine 410. In certain examples, the user may not create a wish list or shopping list in advance of a particular trip. In these examples, the mobile device 115 can be used to enter items on-the-fly (e.g., during a trip) at operation 1210. In the example where the user has a shopping list created, the method 1200 can continue at operation 1210 with the user selecting items from the shopping list via the mobile device 115.

At operation 1215, the method 1200 can continue with the user entering a destination into the mobile device 115 in order to obtain a navigation route (refer to FIG. 12 for an example route display on a mobile device, such as mobile device 115). The operations in method 1200 do not necessarily need to be performed in the illustrated order. For example, the user can enter a destination at operation 1215 prior to selecting items from a shopping list at operation 1210.

At operation 1220, the method 1200 can optionally continue with the navigation route being displayed for review on the mobile device 115. In certain examples, the items selected at operation 1210 can also be displayed if available from merchants along the navigation route.

At operation 1225, the method 1200 can continue with the user selecting items for purchase during the planned trip via the mobile device 115. Item selection can occur via a touch screen interface on the mobile device 115 (if available), with the user selecting items displayed on the map display. In another example, the mobile device 115 can display a list view of the items available at merchant locations within a pre-defined distance from the navigation route. In an example, the display of available items can change in real-time based on actual location (route taken) and available inventory from merchant locations. For example, if the user deviates from the planned navigation route, the network-based navigated shopping system 125 can recalculate the available items from merchants within a certain distance of the new route or current location.

At operation 1230, the method 1200 can optionally continue with the mobile device 115 presenting purchase options to the user. In an example, the purchase options can include store (merchant) pickup (typically the default), home delivery, or delay. The delay option allows the user to delay a decision regarding pickup, and the network-based navigated shopping system 125 will request instructions regarding delivery at a later time. In an example, if the user selects delay and then passes the merchant location on the navigation route, the network-based navigated shopping system 125 can automatically revert to home delivery or can be instructed to locate a different merchant location along the route. In an example, the purchase options can also include payment options. The payment options can include immediate payment (including method of payment), pay after delivery, pay at pickup, or some form of deferred payment, among others. In certain examples integrated into mobile device 115B, a vehicle registration number (e.g., license plate) can be used to validate payment upon merchant pickup. In other examples, the mobile device 115 can include biometric (e.g., finger print or voice recognition) authentication and authorization systems that can be used in conjunction with a navigated shopping service.

At operation 1235, the method 1200 can continue with the user authorizing payment for the selected items via the mobile device 115. At operation 1240, the method 1200 continues with the mobile device 115 receiving a receipt for purchased items. In an example, the receipt received by the mobile device 115 can include pickup or delivery instructions for the selected items.

Finally, at operation 1245, the method 1200 can conclude with the user receiving the purchased items from the merchant locations. In some examples, the user can collect the purchased items from each of the merchant locations along the navigation route. In other examples, the purchased items (or some of the purchased items) can be delivered to the user's home. Alternatively, the purchased items can be delivered to the planned destination address. The mechanism of receipt of the purchased items may be dependent on the purchase option(s) selected in operation 1230.

Figure 13:
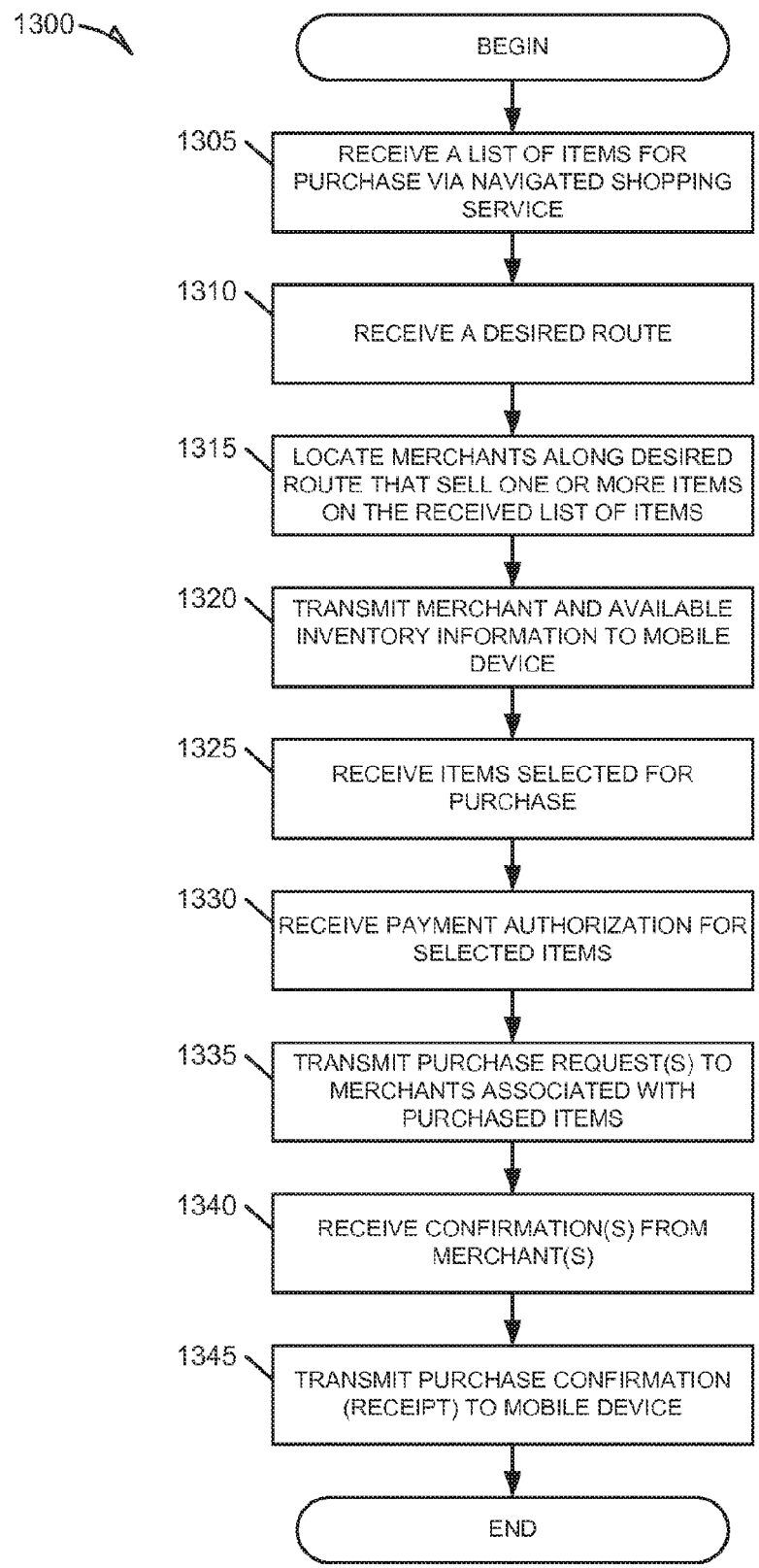
FIG. 13 is a flowchart illustrating a method for providing navigated shopping services, according to an example embodiment.

FIG. 13 is a flowchart illustrating a method 1300 for providing navigated shopping services, according to an example embodiment. In an example, the method 1300 can include operations such as receiving a list of items at operation 1305, receiving a desired route at operation 1310, locating merchants along the route at operation 1315, transmitting merchant and available inventory information at operation 1320, receiving items selected for purchase at operation 1325, receiving payment authorization at operation 1330, transmitting purchase requests to merchants at operation 1335, receiving confirmations from merchants at operation 1340, and transmitting purchase confirmation at operation 1345. In an example, the method 1300 can be performed on the network-based navigated shopping system 125 or the networked system 402.

In an example, the method 1300 can begin at operation 1305 with the networked system 402 receiving a list of items for purchase via the navigated shopping service. At operation 1310, the method 1300 can continue with the networked system 402 receiving a desired route from a client machine, such as client machine 412. In an example, instead of a route, the networked system 402 can receive a desired destination, and the networked system 402 can develop the route (such as via the routing module 505).

At operation 1315, the method 1300 can continue with the networked system 402 locating merchant locations along the desired navigation route that sell one or more of the items received for purchase via the navigated shopping service. In an example, the networked system 402 can also determine whether the merchant location has the desired item or items in inventory. In certain examples, the networked system 402 can communicate with a real-time inventor service, such as MILO (from eBay Inc. of San Jose Calif.), to determine available inventory.

At operation 1320, the method 1300 can continue with the networked system 402 transmitting merchant and available inventor information to a client machine, such as the client machine 412. In some examples, the networked system 402 also transmits route and map information to the client machine 412.

At operation 1325, the method 1300 can continue with the networked system 402 receiving items selected for purchase via the navigated shopping service. At operation 1330, the method 1300 can continue with the networked system 402 receiving payment authorization for the selected items. Additionally, the networked system 402 can also receive purchase options associated with each of the items selected for purchase (not specifically illustrated within method 1300). See discussion above in reference to FIG. 6 for available purchase options that can be handled by the networked system 402.

At operation 1335, the method 1300 can continue with the networked system 402 transmitting purchase requests to the merchants associated with the purchased items. In an example, the networked system 402 can also transmit delivery instructions associated with each of the purchased items. For example, one of the purchased items may need to be delivered, while a different purchased item may be prepared for pickup.

At operation 1340, the method 1300 can continue with the networked system 402 receiving confirmations from the merchants regarding the purchased items. The confirmations can include an availability indictor and shipping information, among other things. At operation 1345, the method 1300 can conclude with the networked system 402 transmitting purchase confirmation information to the client machine 412. The confirmation sent to the client machine 412 can include a receipt, pickup instructions, delivery confirmation, and any other information needed for the user to receive the purchased items.

Example Navigated Shopping System User Interfaces

Figure 14A:
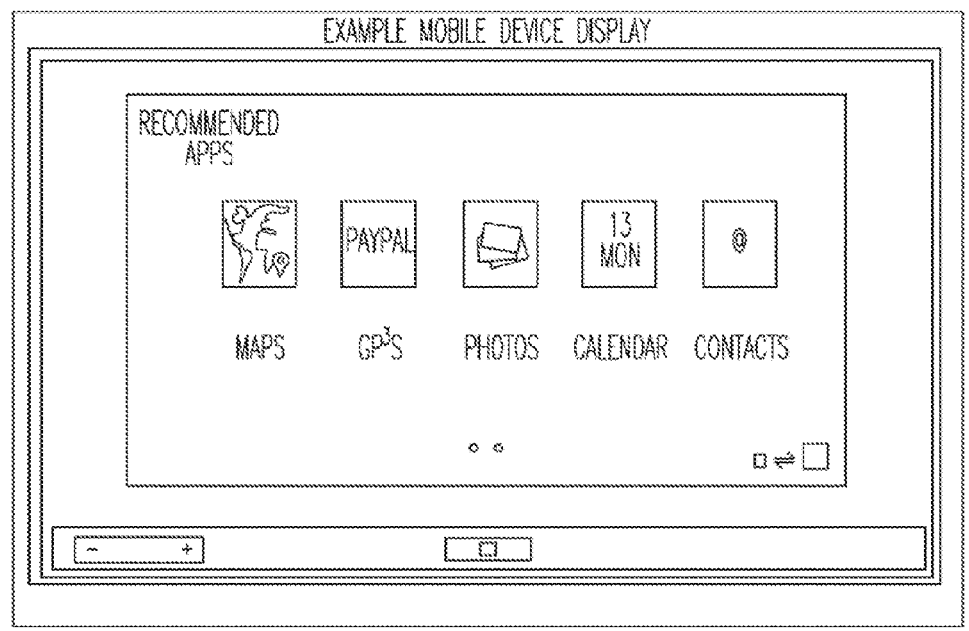
FIG. 14A is an illustration of a mobile device display, according to an example embodiment.
Figure 14B:
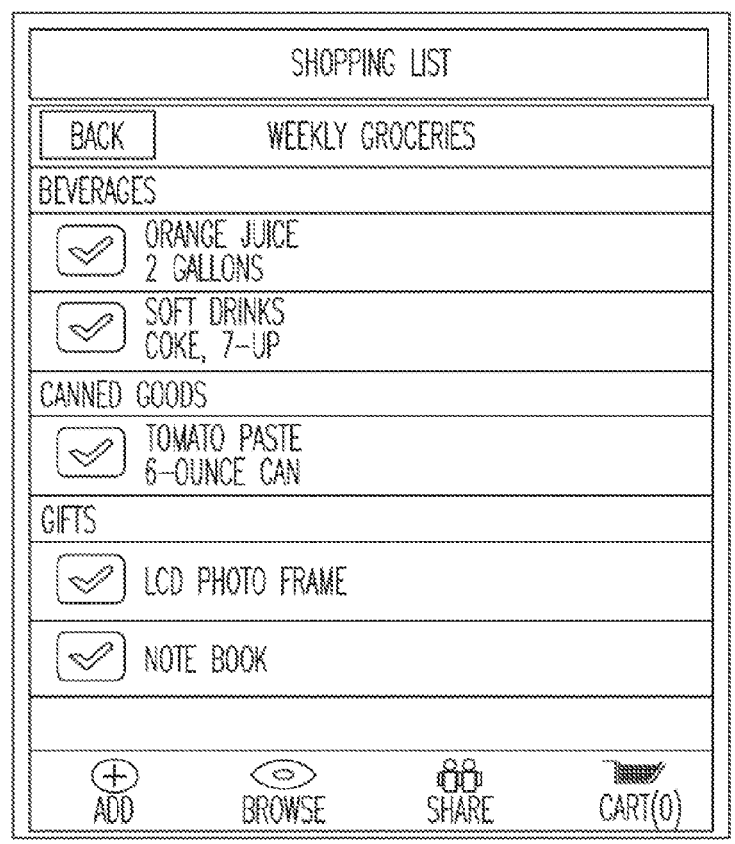
FIG. 14B is an illustration of a shopping list for use with a navigated shopping system, according to an example embodiment.

FIG. 14A is an illustration of a mobile device display 1400, according to an example embodiment. In an example, a user can download and install a navigated shopping application onto a mobile device, such as in-vehicle mobile device 115B. Once installed, the navigated shopping application can allow a user to create a wish list of items, such as the wish list illustrated in FIG. 14B. In certain examples, the navigated shopping system can provide web-based (e.g., browser) and/or smart phone application interfaces for wish list maintenance.

Figure 15:
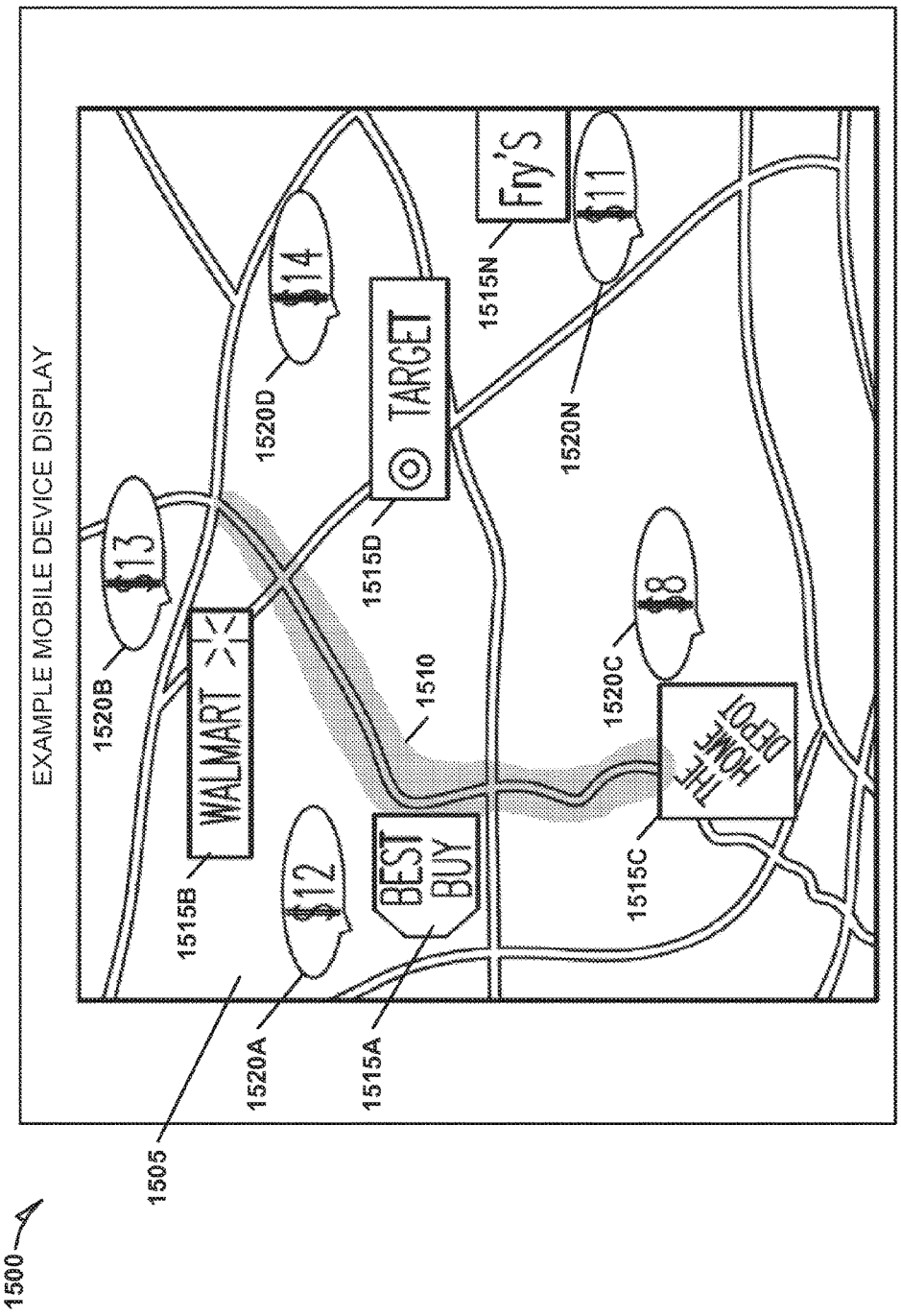
FIG. 15 is an illustration of a mobile device display depicting a shopping route provided by a navigated shopping service, according to an example embodiment.

FIG. 15 is an illustration of a mobile device display 1500 depicting a shopping route provided by a navigated shopping service, according to an example embodiment. The mobile device display 1500 can include a map view 1505, a highlighted route 1510, retail locations 1515A-1515N (collectively referred to as retail location(s) 1515), and purchase price indicators 1520A-1520N (collectively referred to as purchase price indictor(s) 1520). In an example, the user can specify a distance off-route for display of retail locations 1515. In another example, the map view 1505 can be limited to displaying only the retail locations 1515 selected by the navigated shopping application.

Example Local Listings Method

Figure 16:
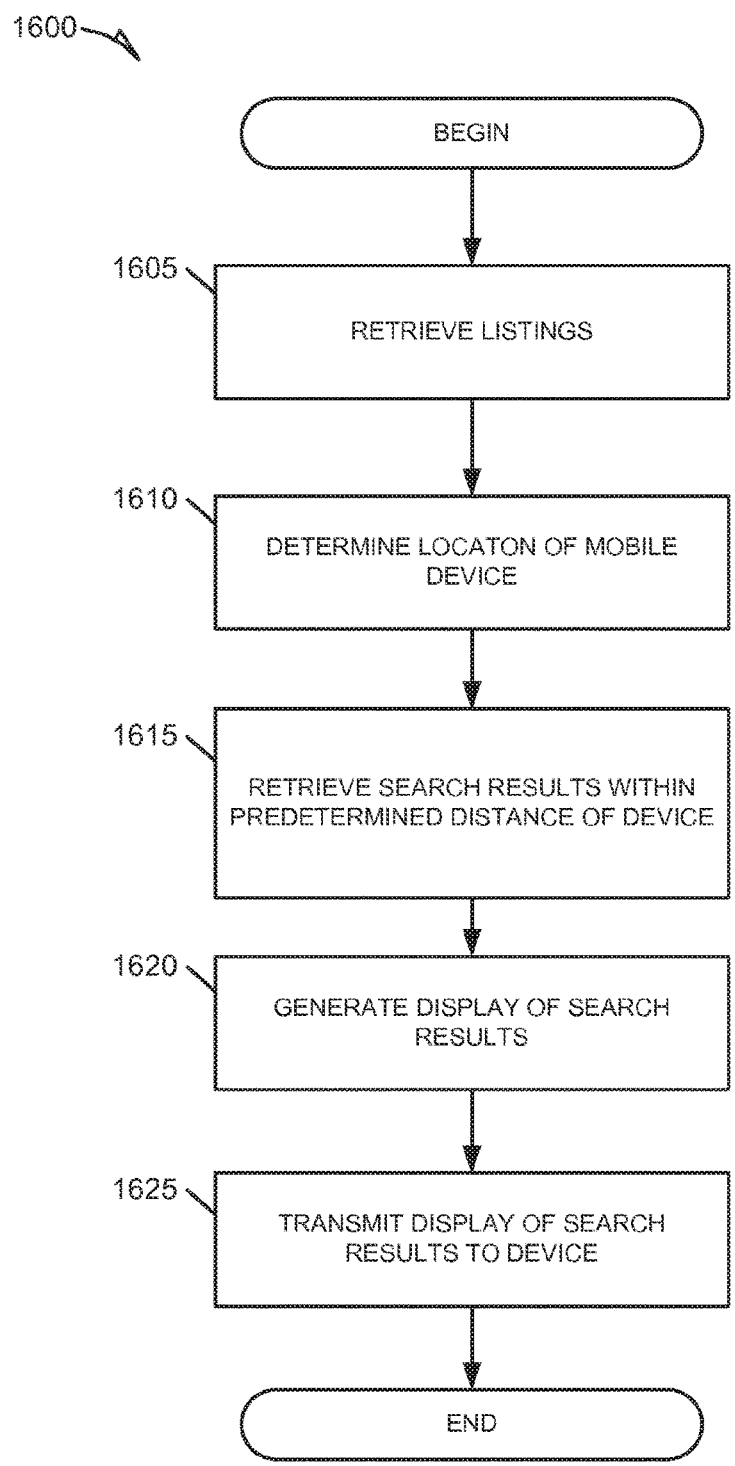
FIG. 16 is a flow chart illustrating a method for providing location-based services, according to an example embodiment.

FIG. 16 is a flow chart illustrating a method 1600 for providing location-based services, according to an example embodiment. In an example, the method 1600 can include operations such as: retrieving listings at operation 1605, determining a location of a mobile device at operation 1610, retrieving search results at operation 1615, generating a display of search results at operation 1620, and transmitting the display at operation 1625. At operation 1605, the method 1600 can begin with the networked system 402 receiving a request to view listings received from a client device and retrieving listings matching the search request. The request may be generated by a mobile application (e.g., a programmatic application, a web browser application) executing in the client device 115. The request may be a search query containing one or more search parameters by which to search listings stored within networked system 402. Alternatively, the request may be a request to navigate among categories and sub-categories of stored listings. Listings may pertain to items or services offered for sale, or other varieties of published information. In some embodiments, listings may pertain to events, such as garage or estate sales, which have finite time duration and which may offer one or more items for sale.

At operation 1610, the method 1600 can continue with the networked system 402 determining, or in some examples receiving, a location associated with the client device 115. In some embodiments, the location may be transmitted with the request to view listings. In some embodiments, location-related data may be transmitted from the client device 115, and a location may be ascertained based on the location-related data. For example, a set of longitude and latitude coordinates may be transmitted, and from the coordinates, a location (e.g., cross-streets, city, state, region) may be determined. In other examples, the networked system 402 can operate to ascertain the location of the mobile device 115 through other means, such as communication with a network service provider that tracks location of mobile devices, such as mobile device 115.

At operation 1615, the method 1600 can continue with the networked system 402 using the location information to retrieve listings having locations identified as being with a predetermined geographic proximity to the client device 115. The listings may be stored with location information indicating where the item or service being offered is located.

At operation 1620, the method 1600 can continue with the networked system 402 generating an interface that depicts retrieved listings relative to the location of the client device (see discussion related to FIGS. 17 and 18 below for additional details). In some embodiments, the interface may be a map with listings and the client device may be overlaid. In some embodiments, the interface may be a web page containing a list of listings ordered according to one of a variety of attributes, such as distance from the client device. At operation 1625, the method 1600 can conclude with the networked system 402 transmitting the interface to the user.

Example Local Listings User Interfaces

Figure 17:
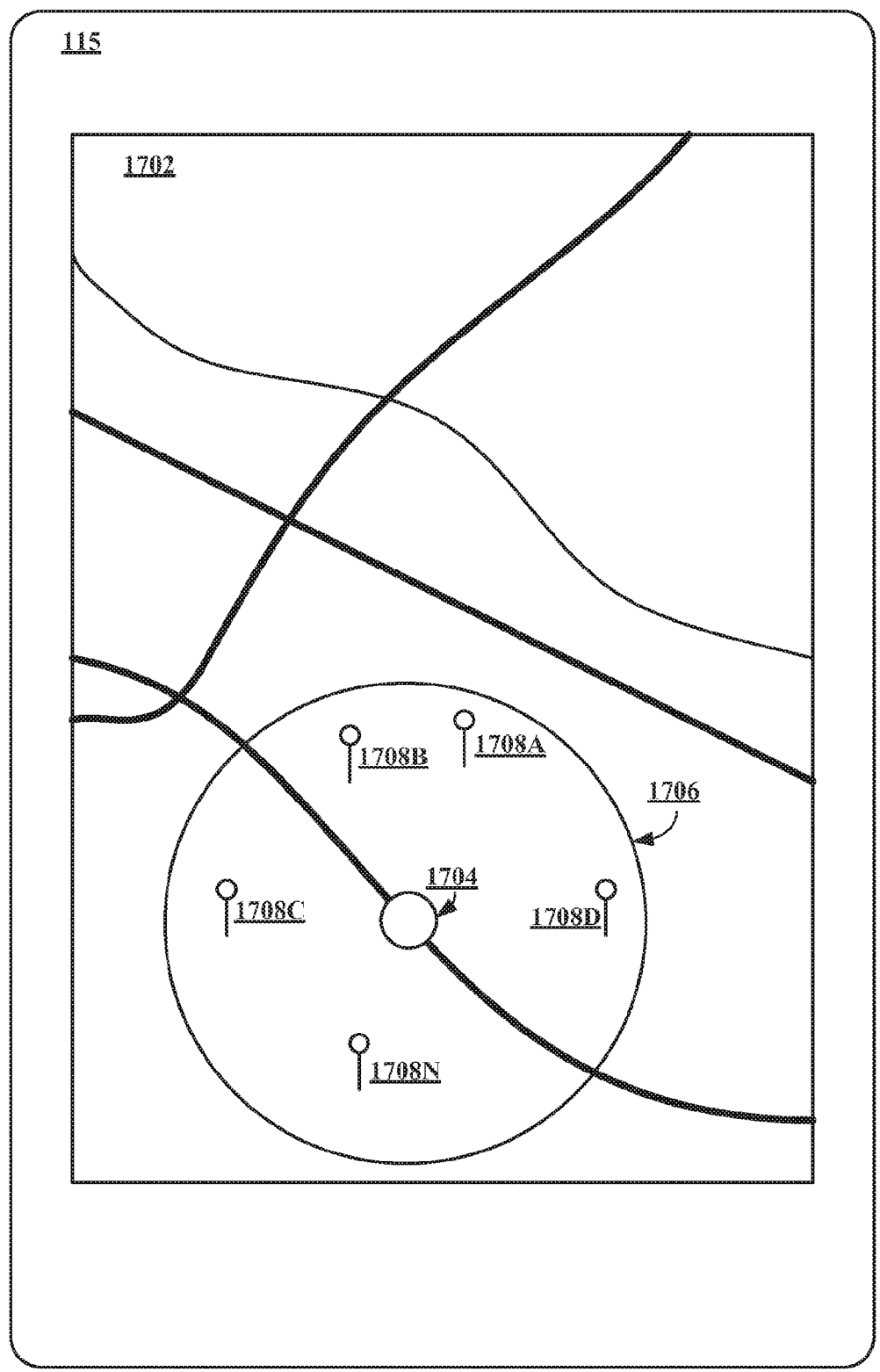
FIG. 17 is a user interface diagram depicting location-based services operating on a client device, according to an example embodiment.

FIG. 17 is a user interface diagram depicting location-based services operating on a client device, according to an example embodiment. Referring to FIG. 17, an example client device 115 is shown. Client device 115 may have a display screen area 1702 on which a map is shown. The map may be an interface belonging to an application capable of being selected for execution by a user of the client device 115. The map may display a region surrounding a determined location, such as location 1704, of the client device 115. For illustration purposes, the map illustrated in FIG. 17 is a rudimentary map. The map may illustrate a location of the client device 115 as determined by location generating circuitry, such as the GPS Receiver 380 (FIG. 3). One or more listings 1708A-1708N (collectively referred to as listing(s) 1708) that are within a predefined radius 1706 of client device 115 and may be displayed on the map. In some embodiments, the user may define a radius 1706 within which the user is interested in having listings presented. The radius 1706 may be defined as a distance (e.g., miles) or as an amount of time to travel to the location of the listing (e.g., minutes). In an example, the user interface can provide various methods for a user to input radius 1706, such as dragging a circle on the display screen area 1702, a scroll bar, or a numerical input, among others.

In some embodiments, any listings located within the radius 1706 of the current location of the user may be displayed. In some embodiments, listings corresponding to saved searches, categories or sub-categories indicated as of interest to the user, groups of interest to the user, specific items of interest to the user, and so forth may be presented. For example, if a user is looking for a chainsaw, the user may specify and save certain criteria, such as one or more of a maximum price, a brand, a condition of the item, a minimum reputation score of a seller of an item, and a distance of the item from the location of the user, within the networked system 402. When a user travels within a predefined proximity of a listing 1708 meeting the user's saved criteria, the listing 1708 may be presented to the user as being a local listing. In an example, the user interface on the mobile device 115 can automatically change to displaying a detailed description of the local listing selected from listings 1708 based on proximity.

In some embodiments, a subset of listings that are available for presentation may be presented to the user. By displaying only a subset of listings, the display screen area 1702 of the client device 115 may avoid becoming overcrowded. In other embodiments, if the number of available listings 1708 meeting the criteria set forth for presentation to the user exceeds a predetermined threshold, the map may be zoomed in to a finer granularity to display a more manageable number of listings 1708.

In some embodiments, icons representing certain listings on the map may be color coded, enlarged, or otherwise emphasized to highlight the listings to the user. Various factors may cause listings to be emphasized. For example, if a listing corresponds to an event, such as a garage sale or estate sale, the listing may have a finite time period before expiration. The listings may be visually emphasized to notify a user that the listing corresponding to the event may be expiring soon. In other embodiments, icons representing certain listings may be emphasized if the listings meet certain saved criteria. For example, listings meeting the criteria of a user may be emphasized to alert a user that an item desired by the user is located nearby to the user.

In some embodiments, a notification may be presented to a user that a local listing, selected from listings 1708, is available. The notification may be a pop-up, a message, a sound, or other type of notification that alerts a user visually and/or audibly as to the availability of a listing 1708.

Figure 18:
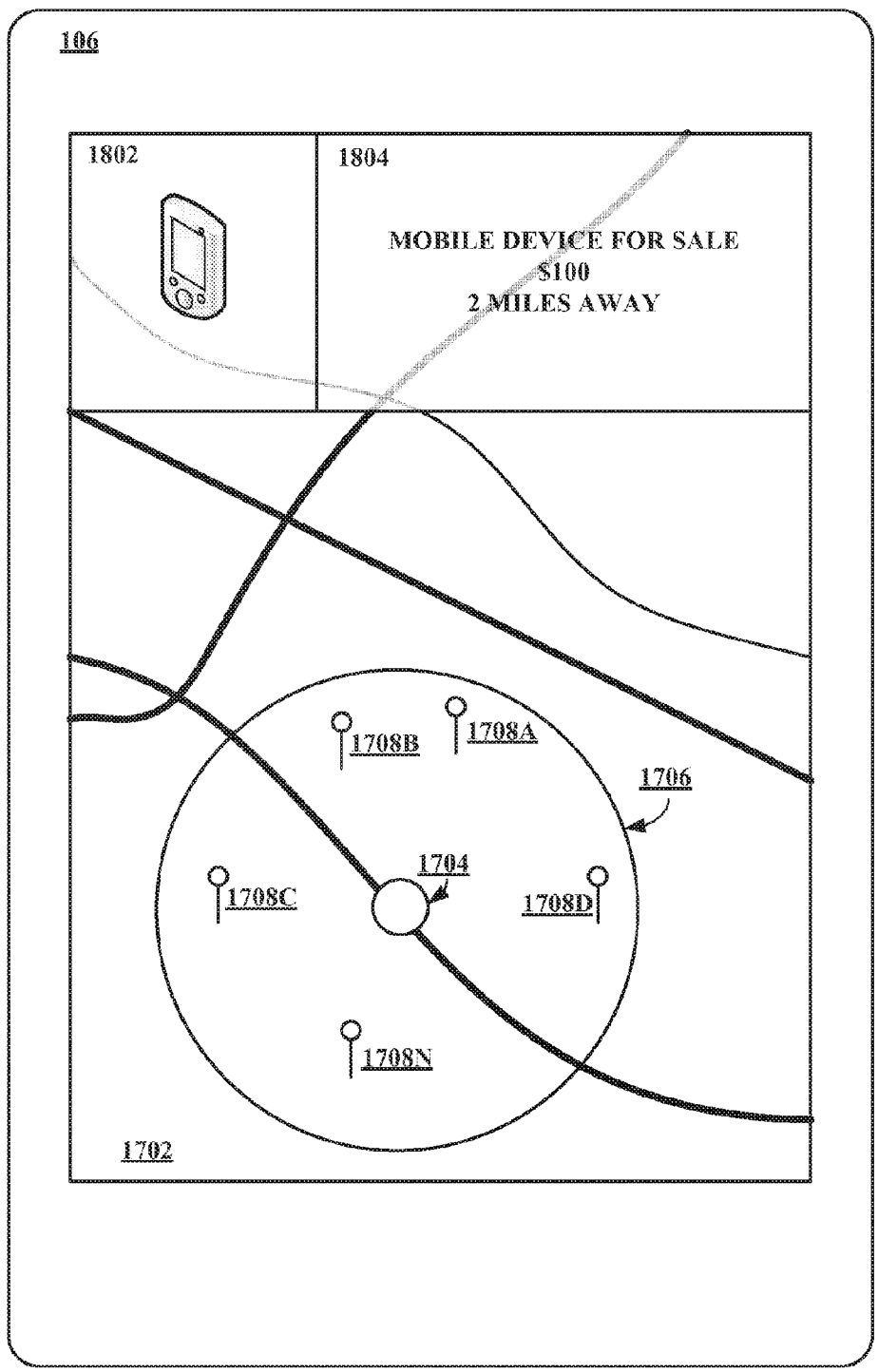
FIG. 18 is a diagram depicting a location-based service operating on a client device, according to an example embodiment.

FIG. 18 is a diagram depicting a location-based service operating on a client device, according to an example embodiment. FIG. 18 illustrates the mobile device 115, (also illustrated in FIG. 17) in which a map depicting a location of mobile device 115 and listings located within a radius 1706 of the mobile device 115 are shown on a display screen area 1702 of the mobile device 115. In the example embodiment of FIG. 18, a user may select one of the listings 1708 displayed on the map by, for example, using a touch-based gesture to select an icon representing the listing, such as listing 1708A. In some embodiments, information pertaining to the listing 1708A may be presented on the display screen area 1702. For example, listing information, such as a title and description of an item offered for sale, may be shown (e.g., interface elements 1802 and 1804). In some embodiments, a distance of the seller of the item from the current location of the user may be shown as well. One or more images of the item may also be shown. In some embodiments, information permitting a user to contact the seller may be provided, such as a telephone number, an email address, an instant message user name, and the like. In some embodiments, the application may facilitate communication between the user and the seller upon selection of a user interface element, such as a button or link. In some embodiments, an address and directions to the opposing party's location may be provided.

In some embodiments, the identity of the user (e.g., buyer) interested in a listing may be revealed to a user (e.g., seller) associated with a listing. In some embodiments, the identity may be revealed when the buyer attempts to communicate with the seller regarding a listing. In this respect, given that a listing may facilitate a local in-person transaction, the seller may be able to gather information about the potential buyer before the buyer and seller meet in person.

Figure 11:
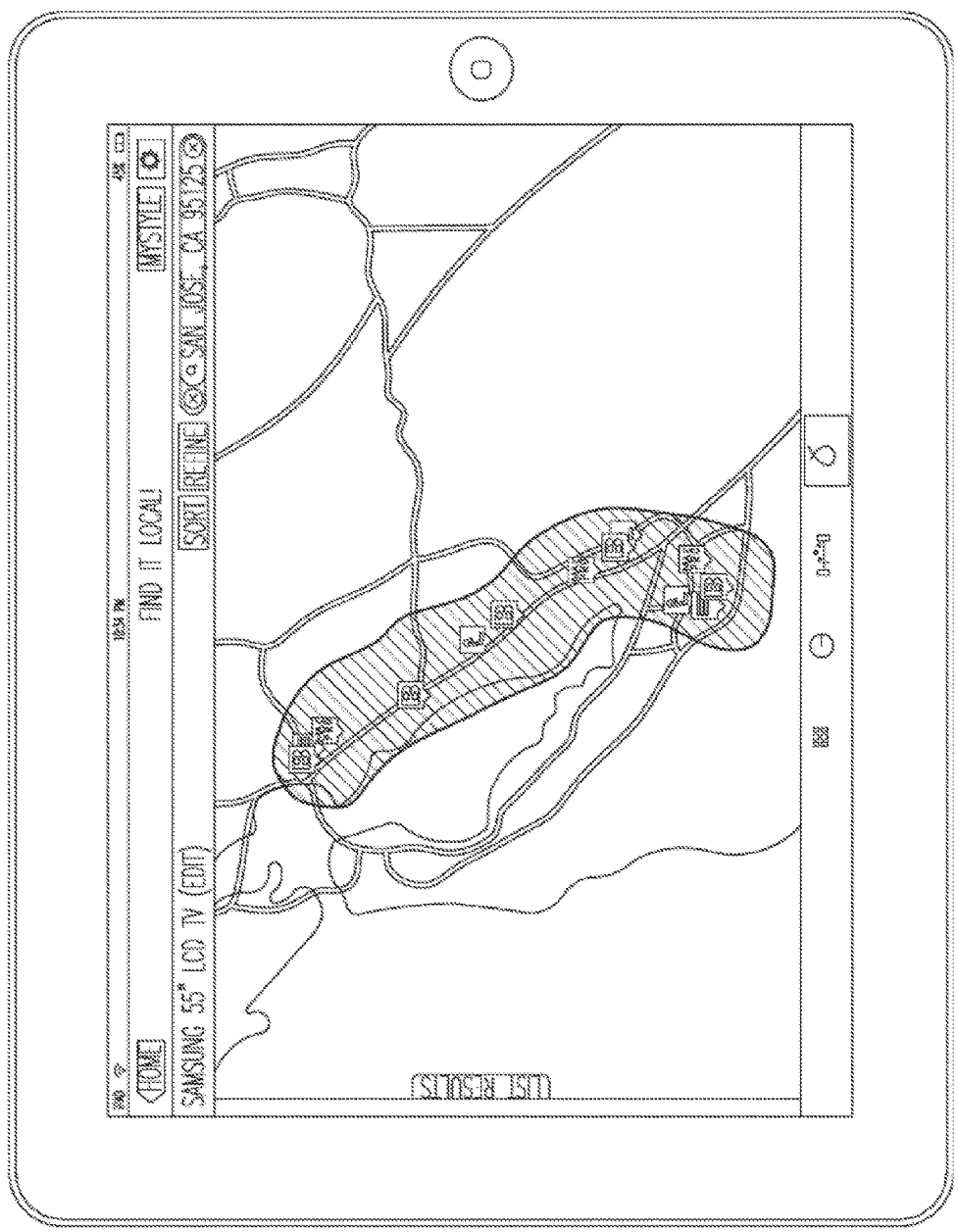
FIG. 11 illustrates an example user interface displaying search results within a corridor on an interactive map, according to some embodiments of the invention.

Although example embodiments disclosed herein illustrate listings 1708 that fall within a circular radius 1706 of a user's location, it is contemplated that listings within other predetermined geographic proximities to the user may be presented. For example, listings that fall within a corridor of travel of a user may be presented, such as illustrated in FIG. 11. The corridor of travel may be determined based on the location and direction of movement of a client device of a user. In some embodiments, listings that are in the directional path of a user may be presented, while in other embodiments, listings that are both in front of and behind the directional path of the user's travel may be presented.

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 19:
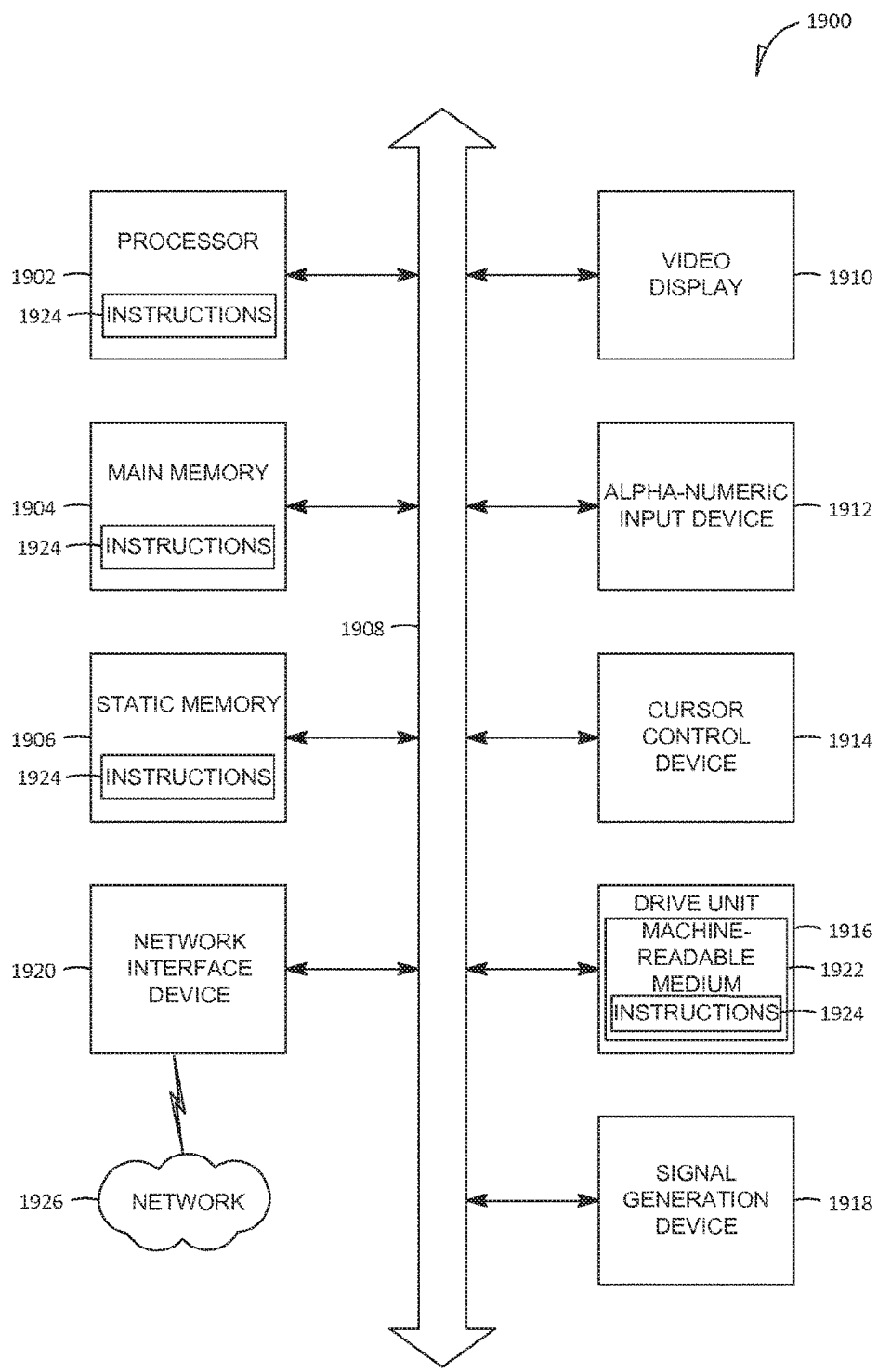
FIG. 19 is a diagrammatic representation of a machine in the example form of a computer system within which a set of instructions for causing the machine to perform any one or more of the methodologies discussed herein may be executed.

FIG. 19 is a block diagram of machine in the example form of a computer system 1900 within which there may be executed instructions 1924 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a cursor control device 1914 (e.g., a user interface (UI) navigation device or computer mouse), a disk drive unit 1916, a signal generation device 1918 (e.g., a speaker) and a network interface device 1920.

Machine-Readable Medium

The disk drive unit 1916 includes a machine-readable medium 1922 on which is stored one or more sets of data structures and instructions 1924 (e.g., software) embodying or used by any one or more of the methodologies or functions described herein. The instructions 1924 may also reside, completely or at least partially, within the main memory 1904, static memory 1906, and/or within the processor 1902 during execution thereof by the computer system 1900, the main memory 1904 and the processor 1902 also constituting machine-readable media.

While the machine-readable medium 1922 is shown in an example embodiment to be a single medium, the term "machine-readable medium" may include a single medium or multiple media (e.g., a centralized or distributed database, and/or associated caches and servers) that store the one or more instructions 1924 or data structures. The term "machine-readable medium" shall also be taken to include any tangible medium that is capable of storing, encoding or carrying instructions for execution by the machine and that cause the machine to perform any one or more of the methodologies of the embodiments of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks. A "machine-readable storage medium" shall also include devices that may be interpreted as transitory, such as register memory, processor cache, and RAM, among others. The definitions provided herein of machine-readable medium and machine-readable storage medium are applicable even if the machine-readable medium is further characterized as being "non-transitory." For example, any addition of "non-transitory," such as non-transitory machine-readable storage medium, is intended to continue to encompass register memory, processor cache and RAM, among other memory devices.

Transmission Medium

The instructions 1924 may further be transmitted or received over a communications network 1926 using a transmission medium. The instructions 1924 may be transmitted using the network interface device 1920 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

What is claimed is:

1. A method comprising:
  receiving a user input onto a map image displayed on a navigation-enabled mobile device, the user input tracing a route from a starting point to a destination, and the route including a set of roads connecting the starting point to the destination;
  receiving a selection of a mode of transportation;
  defining a threshold deviation away from the route, wherein the threshold deviation includes a maximum travel time away from the route, from a current location;
  defining a search corridor based on the route and the threshold deviation, the search corridor encompasses the route and extends a distance defined by the selection of the mode of transportation and the threshold deviation away from the route;
  receiving a search query that includes the current location of the navigation-enabled mobile device;
  retrieving a set of search results based on the search query, the current location of the navigation-enabled mobile device, the mode of transportation, and the search corridor;
  deriving a travel time of each of the set of search results based on the current location of the navigation-enabled mobile device and the selection of the mode of transportation;
  sorting the set of search results based on the travel time from the current location to each of the set of search results; and
  causing display, at the navigation enabled device, of the set of search results based on the sorting.

2. The method of claim 1, wherein receiving the search query further comprising receiving, via the navigation-enabled mobile device, a list of items a user desires to purchase while traveling to the destination location.

3. The method of claim 1, wherein the causing display of the set of search results includes displaying the set of search results at locations along the desired route.

4. The method of claim 1, wherein the set of search results comprises a plurality of items for purchase at a plurality of retail locations, and the method further comprises receiving a selected item from among the plurality of items for purchase.

5. The method of claim 4, further comprising:
  presenting one or more payment options; and
  receiving a purchase request, the purchase request including a payment option from among the one or more payment options.

6. The method of claim 1, further comprising guiding, via the navigation-enabled mobile device, a user along the desired route, the desired route updated to include one or more retail locations as intermediate destinations along the route to a destination location.

7. The method of claim 6, further comprising guiding the user along the route, wherein the guiding the user along the route includes receiving a selection of a search result from among the set of search results; and
  updating the route based on the selection.

8. A navigated-shopping-service server comprising:
  one or more processors; and
  a memory device including instructions that, when executed by the one or more processors on the navigated-shopping-service server, cause the server to perform operations comprising:
    receiving a user input onto a map image displayed on a navigation-enabled mobile device, the user input tracing a route from a starting point to a destination, and the route including a set of roads connecting the starting point to the destination;
    receiving a selection of a mode of transportation;
    defining a threshold deviation away from the route, wherein the threshold deviation includes a maximum travel time away from the route, from a current location;

defining a search corridor based on the route and the threshold deviation, the search corridor encompasses the route and extends a distance defined by the selection of the mode of transportation and the threshold deviation away from the route;

receiving a search query that includes the current location of the navigation-enable mobile device;

retrieving a set of search results based on the search query, the current location of the navigation-enabled mobile device, the mode of transportation, and the search corridor;

deriving a travel time of each of the set of search results based on the current location of the navigation-enabled mobile device and the selection of the mode of transportation;

sorting the set of search results based on the travel time from to the current location to each of the set of search results; and causing display, at the navigation enabled device, of the set of search results based on the sorting.

9. The navigated-shopping-service server of claim 8, wherein the memory device further includes instructions that cause the server to perform operations further comprising:

presenting one or more payment options; and receiving a purchase request, the purchase request including a payment option from among the one or more payment options.

10. The navigated-shopping-service server of claim 8, wherein the memory device further includes instructions that cause the server to perform operations further comprising:

receiving, via the navigation-enabled mobile device, a list of items a user desires to purchase while traveling to the destination location.

11. The navigated-shopping-service server of claim 8, wherein the memory device further includes instructions that cause the server to perform operations further comprising:

displaying the set of search results at locations along the desired route.

12. The navigated-shopping-service server of claim 8, wherein the set of search results comprises a plurality of items for purchase at a plurality of retail locations, and the memory device further includes instructions that cause the server to perform operations further comprising:

receiving a selected item from among the plurality of items for purchase.

13. The navigated-shopping-service server of claim 8, the memory device further includes instructions that cause the server to perform operations further comprising:

guiding, via the navigation-enabled mobile device, a user along the desired route, the desired route updated to include one or more retail locations as intermediate destinations along the route to a destination location.

14. The navigated-shopping-service server of claim 8, wherein the memory device further includes instructions that cause the server to perform operations further comprising:

receiving, from the mobile device, payment authorization data for the plurality of selected items; and wherein the instructions that cause the server to transmit the purchase requests further include instructions that cause the server to transmit the payment authorization data.

15. A non-transitory machine-readable storage medium including instructions that, when executed by one or more processors on a mobile device, cause the mobile device to perform operations comprising:

receiving a user input onto a map image displayed on a navigation-enabled mobile device, the user input tracing a route from a starting point to a destination, and the route including a set of roads connecting the starting point to the destination;

receiving a selection of a mode of transportation;

defining a threshold deviation away from the route, wherein the threshold deviation includes a maximum travel time away from the route, from a current location;

defining a search corridor based on the route and the threshold deviation, the search corridor encompasses the route and extends a distance defined by the selection of the mode of transportation and the threshold deviation away from the route;

receiving a search query that includes the current location of the navigation-enable mobile device;

retrieving a set of search results based on the search query, the current location of the navigation-enabled mobile device, the mode of transportation, and the search corridor;

deriving a travel time of each of the set of search results based on the current location of the navigation-enabled mobile device and the selection of the mode of transportation;

sorting the set of search results based on the travel time of each of the set of search results; and causing display, at the navigation enabled device, of the set of search results based on the sorting.

16. The non-transitory machine-readable storage medium of claim 15, wherein the instructions further include instructions that cause the mobile device to perform operations further comprising:

presenting one or more payment options; and receiving a purchase request, the purchase request including a payment option from among the one or more payment options.

17. The non-transitory machine-readable storage medium of claim 15, wherein the instructions that cause the mobile device to receive the selection of the selected item include instructions that cause the mobile device to display a delivery option for the selected item.

* * * * *